(12) United States Patent
Sano et al.

(10) Patent No.: US 12,024,752 B2
(45) Date of Patent: Jul. 2, 2024

(54) STEEL SHEET AND METHOD FOR MANUFACTURING SAME

(71) Applicant: NIPPON STEEL CORPORATION, Tokyo (JP)

(72) Inventors: Kohichi Sano, Tokyo (JP); Hiroyuki Kawata, Tokyo (JP); Kengo Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 74 days.

(21) Appl. No.: 17/600,021

(22) PCT Filed: Apr. 8, 2020

(86) PCT No.: PCT/JP2020/015765
§ 371 (c)(1),
(2) Date: Sep. 29, 2021

(87) PCT Pub. No.: WO2020/209275
PCT Pub. Date: Oct. 15, 2020

(65) Prior Publication Data
US 2022/0186337 A1 Jun. 16, 2022

(30) Foreign Application Priority Data
Apr. 11, 2019 (JP) .............................. JP2019-075692

(51) Int. Cl.
*C22C 38/00* (2006.01)
*B32B 15/01* (2006.01)
*C21D 6/00* (2006.01)
*C21D 8/02* (2006.01)
*C21D 9/46* (2006.01)
*C22C 38/02* (2006.01)
*C22C 38/04* (2006.01)
*C22C 38/06* (2006.01)
*C22C 38/08* (2006.01)
*C22C 38/12* (2006.01)
*C22C 38/14* (2006.01)
*C22C 38/16* (2006.01)
*C22C 38/18* (2006.01)
*C23C 2/02* (2006.01)
*C23C 2/28* (2006.01)

(52) U.S. Cl.
CPC .............. *C21D 9/46* (2013.01); *B32B 15/013* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C23C 2/02* (2013.01); *C23C 2/0224* (2022.08); *C23C 2/024* (2022.08); *C23C 2/28* (2013.01); *C23C 2/29* (2022.08); *C21D 2211/008* (2013.01)

(58) Field of Classification Search
None
See application file for complete search history.

(56) References Cited

U.S. PATENT DOCUMENTS

| | | | |
|---|---|---|---|
| 2011/0030854 A1* | 2/2011 | Matsuda | ................ C23C 2/02 148/624 |
| 2011/0048589 A1 | 3/2011 | Matsuda et al. | |
| 2014/0242416 A1 | 8/2014 | Matsuda et al. | |
| 2015/0086808 A1 | 3/2015 | Kasuya et al. | |
| 2016/0208359 A1 | 7/2016 | Kasuya et al. | |
| 2018/0230581 A1 | 8/2018 | Okamoto et al. | |
| 2019/0003009 A1 | 1/2019 | Kawata et al. | |
| 2019/0203317 A1 | 7/2019 | Yoshioka et al. | |

FOREIGN PATENT DOCUMENTS

| | | |
|---|---|---|
| CN | 103857819 A | 6/2014 |
| EP | 2 762 589 A1 | 8/2014 |
| EP | 3 187 607 A1 | 7/2017 |
| EP | 3 406 748 A1 | 11/2018 |
| GB | 2477419 A | 8/2011 |

(Continued)

OTHER PUBLICATIONS

Maki Tadashi, "Phase transformation of steel—Martensite transformation I—Characteristics of martensitic transformation of iron alloys", Materia Japan, 2015, vol. 54, No. 11, pp. 557-563.

(Continued)

*Primary Examiner* — Kim S. Horger
(74) *Attorney, Agent, or Firm* — Birch, Stewart, Kolasch & Birch, LLP

(57) ABSTRACT

This steel sheet has a predetermined chemical composition, in which the area ratio of plate martensite is 10% or more, the average grain size of prior austenite grains is 2.0 μm to 10.0 μm, the maximum diameter thereof is 20.0 μm or less, the amount of solid solution C in martensite is 0.20 mass % or less, the average carbide size is 0.25 μm or less, the crystal orientation difference between plate martensite and another martensite adjacent thereto in the same prior austenite grain is 10.0° or less, and the P concentration at grain boundaries of the prior austenite grains is 4.0 at % or less.

15 Claims, No Drawings

(56) References Cited

FOREIGN PATENT DOCUMENTS

| JP | 61-157625 A | 7/1986 |
| JP | 2007-63604 A | 3/2007 |
| JP | 4730056 B2 | 7/2011 |
| JP | 5305149 B2 | 10/2013 |
| JP | 5365216 B2 | 12/2013 |
| WO | WO 2013/146148 A1 | 10/2013 |
| WO | WO 2015/046339 A1 | 4/2015 |
| WO | WO 2017/037827 A1 | 3/2017 |
| WO | WO 2017/164346 A1 | 9/2017 |
| WO | WO 2018/062381 A1 | 4/2018 |

OTHER PUBLICATIONS

Maki Tadashi, "Phase transformation of steel—Martensite transformation II—Internal microstructure and process-induced transformation of ferroalloy martensite", Materia Japan, 2015, vol. 54, No. 12, pp. 626-632.

\* cited by examiner

STEEL SHEET AND METHOD FOR MANUFACTURING SAME

TECHNICAL FIELD OF THE INVENTION

The present invention relates to a steel sheet and a method for manufacturing the same. Priority is claimed on Japanese Patent Application No. 2019-075692, filed Apr. 11, 2019, the content of which is incorporated herein by reference.

BACKGROUND ART

In recent years, awareness of environmental issues has increased, and in the automobile industry, it is important to reduce the weight of a vehicle body in order to improve fuel efficiency. On the other hand, in order to secure safety in the event of a collision, it is also necessary to increase the strength of the vehicle body. In order to achieve both a reduction in the weight and an improvement in the safety of the vehicle body, the use of a high strength material (high strength steel) is being studied. However, the higher the strength of the steel, the more difficult it is to perform press forming, and even if press forming is performed, the shape of the steel often collapses due to springback. In addition, as the strength increases, toughness tends to deteriorate and impact resistance tends to decrease.

Springback is more likely to occur due to some portions where the steel does not yield. Therefore, it is considered that if it is possible to lower the yield stress of the steel while increasing the maximum strength of the steel, the shape fixability of the steel can be easily improved. However, when the yield stress is decreased, in a case where there is a region in which the amount of deformation is small during pressing, the strength of the region in which the amount of deformation is small decreases, and the impact resistance deteriorates. Therefore, a steel sheet in which the amount of work hardening immediately after yielding is large is desired so that even the region in which the amount of deformation is small has high strength. On the other hand, when the amount of work hardening in the region in which the amount of deformation is large is large, the strength varies greatly depending on the location of the member, and the impact resistance deteriorates. Therefore, in a case where the amount of strain becomes large, a steel sheet in which the amount of work hardening is small is desired.

Furthermore, as described above, as a steel sheet in which the amount of work hardening immediately after yielding is large and the amount of work hardening in a high strain region is small, in a steel sheet of 980 MPa or more, which is effective in reducing the weight of a vehicle body even though the impact resistance is improved while securing the shape fixability, there are cases where the toughness deteriorates. In such a steel sheet, there are cases where the impact resistance is insufficient depending on the design standard. Therefore, there is a demand for a technique for enhancing toughness while providing the above-mentioned work hardening properties.

As a high strength material, composite structure steels such as dual phase (DP) steels described in Patent Documents 1 and 2 and transformation induced plasticity (TRIP) steels described in Patent Documents 3 and 4 are known. Such DP steels and TRIP steels are increased in the strength by allowing a full hard structure to be present in the steel.

Patent Document 5 describes a method for improving low temperature toughness by controlling the amount of crystal grains having small strain to be larger than the amount of crystal grains having large strain. The crystal grains having small strain are bainite.

In order to increase strength, tempered martensite and fresh martensite are necessary. Patent Document 6 discloses a steel sheet having tempered martensite as a main structure in order to cause the strength of the steel sheet to be a high strength.

As a method of lowering the yield stress, there is a technique of increasing moving dislocations by dispersing fresh martensite to allow a steel sheet to be easily yield. For example, Patent Document 7 describes a method for causing the yield stress of a steel sheet to be a low yield stress and increasing the strength and shape fixability by allowing bainite or tempered martensite to be a main structure and further dispersing 18% or less (preferably 10% or less) of fresh martensite in order to cause the strength of the steel sheet to be a high strength.

Patent Document 8 discloses that by causing a steel structure to be a steel structure having 80% or more of auto-tempered martensite by specifying a cooling rate at a martensitic transformation temperature (Ms point) or lower to be relatively low, it is possible to obtain a high strength steel sheet being excellent in ductility and stretch flangeability.

However, the related art described above has the following problems.

The steels disclosed in Patent Documents 1 to 4 are characterized in that the amount of work hardening is increased even in a high strain region in order to enhance uniform elongation. Therefore, the techniques disclosed in Patent Documents 1 to 4 are not suitable in a case where it is desired to improve shape fixability and impact resistance. In addition, the TRIP steels are further increased in the amount of work hardening through the strain-induced transformation of retained austenite. Therefore, it is necessary to limit the amount of retained austenite so that the amount of retained austenite does not remain up to the high strain region.

In Patent Document 5, strength, formability, and toughness are enhanced by setting two types of bainite in a well-balanced fraction. However, in a case where a higher strength is to be achieved, tempered martensite and fresh martensite become a primary phase, which results in an increase in the amount of strain. Therefore, the low temperature toughness cannot be improved.

In Patent Document 6, there is a possibility that the yield stress may be high and the shape fixability may be inferior.

In Patent Document 7, fresh martensite is harder than tempered martensite and bainite, and tends to be an origin of cracking. Therefore, there is a problem that dispersing fresh martensite leads to deterioration of toughness.

In the steel sheet disclosed in Patent Document 8, workability is evaluated by ductility and stretch flangeability. However, the shape fixability is insufficient because the amount of work hardening immediately after yielding cannot be increased and the amount of work hardening in the high strain region cannot be reduced.

PRIOR ART DOCUMENT

Patent Document

[Patent Document 1] Japanese Patent No. 5305149
[Patent Document 2] Japanese Patent No. 4730056
[Patent Document 3] Japanese Unexamined Patent Application, First Publication No. S61-157625

[Patent Document 4] Japanese Unexamined Patent Application, First Publication No. 2007-063604

[Patent Document 5] PCT International Publication No. WO2015/046339

[Patent Document 6] PCT International Publication No. WO2017/037827

[Patent Document 7] PCT International Publication No. WO2013/146148

[Patent Document 8] Japanese Patent No. 5365216

Non-Patent Document

Non-Patent Document 1: Tadashi Maki, "Phase Transformation in Steel-Martensite Transformation I-Characteristic of Martensite Transformation in Ferrous Alloys-" (Materia, Vol. 54, No. 11, November 2015, p. 557-563)

Non-Patent Document 2: Tadashi Maki, "Phase Transformation in Steel-Martensite Transformation II-Substructure of Martensite and Deformation-Induced Transformation in Ferrous Alloys-" (Materia, Vol. 54, No. 12, December 2015, p. 626-632)

DISCLOSURE OF THE INVENTION

Problems to be Solved by the Invention

In view of the current status of the related art, an object of the present invention is to provide, as a high strength steel sheet of a tensile strength of 980 MPa or more capable of achieving both a reduction in the weight of a vehicle body and an improvement in safety, a steel sheet excellent in shape fixability and impact resistance after pressing, which is suitable as a steel sheet for a vehicle subjected to press working, and a method for manufacturing the same.

Means for Solving the Problem

The present inventors intensively studied a method for solving the above problems and obtained the following findings.

(i) After cold rolling, heating to an austenite single phase region is performed while controlling a heating rate. Thereafter, the cooling rate is controlled to suppress ferritic and bainitic transformation. Next, the cooling rate is controlled in a temperature range in which martensitic transformation occurs. Furthermore, a tensile stress is applied. Accordingly, it is possible to form martensite (fresh martensite and tempered martensite) containing plate martensite. Such a structure has a low yield stress, and thus has a large amount of work hardening immediately after yielding and a small amount of work hardening in a high strain region, thereby improving shape fixability.

(ii) By controlling a heating temperature, reduction distribution, and cooling rate of hot rolling, and a heating rate, heating temperature, and time during a heat treatment after cold rolling, the average grain size and maximum size of prior austenite grains can be reduced. Reducing the average grain size and maximum size of the prior austenite grains improves toughness.

(iii) By controlling a thermal history after the martensitic transformation during a heat treatment, the amount of solid solution C in martensite (fresh martensite and tempered martensite) can be reduced, and the average size of carbides in martensite can be reduced. When the amount of solid solution C in martensite decreases, the amount of work hardening in a high strain region decreases. In addition, by reducing the average size of carbides, the amount of work hardening in a low strain region can be increased.

(iv) By controlling cooling after hot rolling, P at prior austenite grain boundaries can be reduced. Reducing P at the prior austenite grain boundaries improves toughness.

The present invention has been made based on the above findings, and the gist thereof is as follows.

(1) A steel sheet including, as a chemical composition, by mass %: C: 0.15% to 0.40%; Si: 0.01% to 2.00%; Mn: 0.10% to 4.00%; Al: 0.005% to 1.500; P: 0.001% to 0.100%; S: 0.0005% to 0.0100%; N: 0.0005% to 0.0100%; Ti: 0% to 0.200%; Mo: 0% to 0.300%; Nb: 0% to 0.200%; Cr: 0% to 4.000%; B: 0% to 0.0050%; V: 0% to 0.300%; Ni: 0% to 4.00%; Cu: 0% to 4.00%; W: 0% to 2.00%; Ca: 0% to 0.0100%; Ce: 0% to 0.0100%; Mg: 0% to 0.0100%; Zr: 0% to 0.0100%; La: 0% to 0.0100%; REM other than Ce and La: 0% to 0.0100%; Sn: 0% to 1.000%; Sb: 0% to 0.200%; and a remainder: Fe and impurities, in which a microstructure at a ¼ thickness which is a range between a ⅛ thickness position in a sheet thickness direction from a surface of the steel sheet and a ⅜ thickness position in the sheet thickness direction from the surface includes, by area ratio, ferrite: 0% to 10%, retained austenite: 0% to 10%, upper bainite: 0% to 10%, martensite: 70% to 100%, and pearlite: 0% to 5%, an area ratio of plate martensite contained in the martensite is 10% to 35% with respect to an area of an entire structure of the steel sheet, an average grain size of prior austenite grains is 2.0 μm to 10.0 μm, and a maximum diameter of the prior austenite grains is 20.0 μm or less, an amount of solid solution C in the martensite is 0.20 mass % or less, an average carbide size in the martensite is 0.25 μm or less, a crystal orientation difference between the plate martensite and another martensite adjacent to the plate martensite in the same prior austenite grain is 10.0° or less, and a P concentration at grain boundaries of the prior austenite grains is 4.0 at % or less.

(2) The steel sheet according to (1), in which a hot-dip galvanized layer is formed on the surface.

(3) The steel sheet according to (2), in which the hot-dip galvanized layer is a hot-dip galvannealed layer.

(4) A method for manufacturing a steel sheet, including: a casing step of melting a steel having the chemical composition according to (1) and casting the melted steel to obtain a steel piece; a hot rolling step of heating the steel piece to 1150° C. to 1350° C. and performing hot rolling in a temperature range of 1050° C. or higher at a cumulative rolling reduction of 35% or more to obtain a hot-rolled steel sheet; a cooling step of performing cooling, which is started within three seconds after completion of the hot rolling step, to a coiling temperature so that an average cooling rate in a temperature range of 850° C. or lower and higher than 700° C. is 20° C./sec to 100° C./sec and an average cooling rate from 700° C. to the coiling temperature is 30° C./sec to 80° C./sec; a coiling step of coiling the hot-rolled steel sheet after the cooling step at a coiling temperature of 650° C. or lower; a cold rolling step of performing cold rolling on the hot-rolled steel sheet after the coiling step to obtain a cold-rolled steel sheet; an annealing step of heating the cold-rolled steel sheet to an annealing temperature of Ac3 to 1000° C. so that an average heating rate in a temperature range of 650° C. to 750° C. is 0.5 to 5.0° C./sec, and performing holding at the annealing temperature for 3 to 100 seconds; a post-annealing cooling step of cooling the cold-rolled steel sheet after the annealing step so that an average cooling rate in a temperature range of 740° C. or lower and higher than 550° C. is 10° C./sec or faster, an average cooling rate in a temperature range of 550° C. or lower and higher than Ms° C. is 30° C./sec or faster, an average cooling rate in a temperature range of Ms° C. or lower and higher than Ms-15° C. is 5° C./sec to 40° C./sec, an average cooling rate in a temperature range of Ms-15° C. or lower and higher than Ms-40° C. is 25° C./sec to 120° C./sec, and an average cooling rate in a temperature range of Ms-40° C. to Ms-120° C. is 5° C./sec to 40° C./sec; and a final cooling step of cooling the cold-rolled steel sheet after the post-annealing cooling step to room temperature at an average cooling rate of 0.5° C./sec to 10° C./sec, in which, in the post-annealing cooling step, a tensile stress of 20 to 100 MPa is applied to the cold-rolled steel sheet in a temperature range of Ms° C. to Ms-120° C., where Ms is calculated by the following expression:

Here, Ms is calculated by the following expression.

$$Ms(°C.) = 550 - 361 \times C - 39 \times Mn - 35 \times V - 20 \times Cr - 17 \times Ni - 10 \times Cu - 5 \times Mo - 5 \times W + 30 \times Al,$$ and C, Mn, V, Cr, Ni, Cu, Mo, W, and Al in the above expression are amounts (mass %) of corresponding elements of the steel piece.

(5) The method for manufacturing a steel sheet according to (4), in which, in the post-annealing cooling step, an average cooling rate is changed for each of the temperature ranges.

(6) The method for manufacturing a steel sheet according to (4) or (5), in which the final cooling step includes a step of holding the cold-rolled steel sheet after the post-annealing cooling step in a temperature range of Ms-120° C. to 450° C. for 1000 seconds or shorter, and performing cooling to room temperature at an average cooling rate of 0.5° C./sec or faster and 10° C./sec or slower.

(7) The method for manufacturing a steel sheet according to any one of (4) to (6), further including: a hot-dip galvanizing step of immersing the cold-rolled steel sheet in a molten zinc bath, between the post-annealing cooling step and the final cooling step.

(8) The method for manufacturing a steel sheet according to (7), further including: an alloying step of reheating the cold-rolled steel sheet to 470° C. to 550° C. and performing holding for 60 seconds or shorter, between the hot-dip galvanizing step and the final cooling step.

Effects of the Invention

According to the present invention, it is possible to provide a high strength steel sheet having a low yield stress, a large amount of work hardening after yielding, a small amount of work hardening in a high strain region, and excellent toughness. That is, it is possible to provide a steel sheet excellent in shape fixability and impact resistance after pressing.

EMBODIMENTS OF THE INVENTION

First, the present inventors examined the configuration of a structure having a low yield stress, a large amount of work hardening after yielding, a small amount of work hardening in a high strain region, and excellent toughness, which is effective in improving shape fixability and impact resistance after pressing.

In the related art, as high strength steel sheets, DP steels, TRIP steels, bainite steels, martensite steels, and the like are known. As described above, the DP steels and TRIP steels have a large amount of work hardening up to a high strain region. The bainite steels have a high yield ratio and can be strengthened up to about 980 MPa. However, the bainite steels have to have a high C content and deteriorate weldability required for a steel sheet for a vehicle, which is inappropriate.

The martensite steels are preferred to achieve high strength. In particular, in a case of obtaining a tensile strength of 980 MPa or more, it is difficult to achieve the tensile strength unless martensite is a main structure. The martensite steels include a single fresh martensite structure, a single tempered martensite structure, and a composite structure of tempered martensite and fresh martensite.

However, when the martensite structure is a generally known single fresh martensite structure, a low yield stress can be achieved because the amount of moving dislocations is large. However, since the amount of solid solution C is large, a large amount of work hardening is obtained even in a high strain region, which is inappropriate. In addition, a generally known single tempered martensite structure has a high yield stress and a small amount of work hardening, which is inappropriate. When the martensite structure is a composite structure of generally known tempered martensite and generally known fresh martensite, a relatively low yield stress and large work hardening immediately after yielding can be achieved, but the amount of work hardening up to a high strain region is large, which is inappropriate.

As described above, high strength can be achieved with the martensite steel in the related art. In addition, although not all the three properties of a low yield stress, a large amount of work hardening immediately after yielding, and a small amount of work hardening up to a high strain region can be satisfied, one or two thereof can be satisfied. Therefore, the present inventors examined that all of high strength, a low yield stress, a large amount of work hardening after yielding, and a small amount of work hardening in a high strain region can be achieved by improving the martensite steel.

Specifically, the present inventors focused on the structure of martensite regarding the martensite steel and conducted intensive studies so as to satisfy all the above three properties that cannot be simultaneously satisfied in the martensite steel in the related art. As a result, it was found that in a case where plate-like martensite (called plate martensite) is present, a low yield stress, a large amount of work hardening after yielding, and a small amount of work hardening in a high strain region can be achieved. In addition, it was also found that by studying hot rolling conditions and heating conditions of heat treatments, the average grain size and maximum diameter of prior austenite grains can be reduced and toughness is improved while maintaining the low yield stress, a large amount of work hardening after yielding, and a small amount of work hardening in a high strain region.

Although the reason why a low yield stress, large work hardening after yielding, and small work hardening in a high strain region can be achieved due to the presence of plate martensite has not been clarified, for example, the following reasons are considered. It is considered that the low yield stress is achieved because plate martensite is coarser than the other martensite, and yielding occurs at a portion of the plate martensite even at a low stress, so that a low yield stress is achieved.

In addition, it is considered that the reason why large work hardening is achieved after yielding is that a crystal orientation difference between plate martensite and surrounding martensite is small, and dislocations generated at the plate martensite are likely to move to the surrounding martensite, so that dislocation strengthening is easily achieved and the work hardening is increased. It is considered that the reason why small work hardening is achieved in a high strain region is that the amount of solid solution C in the plate martensite is low and work hardening is less likely to occur.

Hereinafter, a steel sheet according to an embodiment of the present invention (a steel sheet according to the present embodiment) will be described.

The steel sheet of the present embodiment is made based on the above findings found by the present inventors, and has the following features.

(a) The steel sheet contains, as a chemical composition, by mass %, C: 0.15% to 0.40%, Si: 0.01% to 2.00%, Mn: 0.10% to 4.0%, Al: 0.005% to 1.50%, P: 0.001% to 0.100%, S: 0.0005% to 0.0100%, and N: 0.0005% to 0.0100%, optionally contains one or more of Ti, Mo, Nb, Cr, B, V, Ni, Cu, W, Ca, Ce, Mg, Zr, La, REM other than Ce and La, Sn, and Sb, and contains a remainder consisting of Fe and impurities.

(b) The microstructure at a ¼ thickness which is a range between a ⅛ thickness position in a sheet thickness direction from the surface of the steel sheet and a ⅜ thickness position in the sheet thickness direction from the surface includes, by area ratio, ferrite: 0% to 10%, retained austenite: 0% to 10%, upper bainite: 0% to 10%, martensite: 70% to 100%, and pearlite: 0% to 5%.

(c) The area ratio of plate martensite contained in martensite is 10% to 35% with respect to the area of the entire structure.

(d) The average grain size of prior austenite grains is 2.0 μm to 10.0 μm, and the maximum diameter of the prior austenite grains is 20.0 μm or less.

(e) The amount of solid solution C in the martensite is 0.20% or less.

(f) The average carbide size in the martensite is 0.25 μm or less.

(g) The crystal orientation difference between the plate martensite and another martensite adjacent to the plate martensite in the same prior austenite grain is 10.0° or less.

(h) The P concentration at the grain boundaries of the prior austenite grains is 4.0 at % (atomic %) or less.

Each feature will be described below.

<Chemical Composition>

First, the reason for limiting the chemical composition will be described. Hereinafter, % relating to the chemical composition means mass % unless otherwise specified.

C: 0.15% to 0.40%

C is an element that increases the hardness of martensite and contributes to an improvement in the strength of steel. When the C content is less than 0.15%, it is difficult to achieve a tensile strength of 980 MPa or more. Therefore, the C content is set to 0.15% or more. The C content is preferably 0.17% or more.

On the other hand, when the C content exceeds 0.40%, the generation of cementite is promoted, and formability and toughness decrease. Otherwise, the amount of solid solution C is increased and the amount of work hardening becomes too large. For this reason, the C content is set to 0.40% or less. The C content is preferably 0.37% or less.

Si: 0.01% to 2.00%

Si is an element that contributes to the improvement in the strength and fatigue strength of the steel without lowering ductility through solid solution strengthening. Si is also an element having deoxidation effect during melting. When the Si content is less than 0.01%, the above effect cannot be sufficiently obtained. Therefore, the Si content is set to 0.01% or more. The Si content is preferably 0.03% or more.

On the other hand, when the Si content exceeds 2.00%, the ductility and toughness decrease. Therefore, the Si content is set to 2.00% or less. The Si content is preferably 1.80% or less.

Mn: 0.10% to 4.00%

Mn is an element that contributes to the improvement in the strength by improving solid solution strengthening and hardenability. When the Mn content is less than 0.10%, the above effect cannot be sufficiently obtained. Therefore, the Mn content is set to 0.10% or more. The Mn content is preferably 0.30% or more.

On the other hand, when the Mn content exceeds 4.00%, weldability decreases, the degree of segregation is expanded, and formability during pressing is also decreased. In this case, cracking may occur during a manufacturing process. Therefore, the Mn content is set to 4.00% or less. The Mn content is preferably 3.80% or less.

Al: 0.005% to 1.500%

Al is an element necessary for deoxidation, and is also an element that contributes to an improvement in the formability by suppressing excessive generation of carbides. When the Al content is less than 0.005%, the above effect cannot be sufficiently obtained. Therefore, the Al content is set to 0.005% or more. The Al content is preferably 0.008% or more.

On the other hand, when the Al content exceeds 1.500%, not only is the effect saturated, but also the toughness decreases. Therefore, the Al content is set to 1.500% or less. The Al content is preferably 1.000% or less.

P: 0.001% to 0.100%

P is an element that contributes to the improvement in the strength, and is an element that enhances corrosion resistance in the coexistence with Cu. When the P content is less than 0.001%, the above effect cannot be sufficiently obtained. When the P content is less than 0.001%, a steelmaking cost increases significantly. Therefore, the P content is set to 0.001% or more. From the viewpoint of the steelmaking cost, the P content is preferably 0.010% or more.

On the other hand, when the P content exceeds 0.100%, the weldability and workability decreases. In addition, P significantly deteriorates the toughness by segregating to grain boundaries. Therefore, the P content is set to 0.100% or less. In a case where the standard of toughness is strict, the P content is preferably set to 0.05% or less.

S: 0.0005% to 0.0100%

S is an element that forms a sulfide (MnS or the like) that is an origin of cracking in steel and reduces hole expansibility and total elongation. Therefore, the S content may be low. However, when the S content is reduced to less than 0.0005%, the steelmaking cost increases significantly. Therefore, the S content is set to 0.0005% or more.

On the other hand, when the S content exceeds 0.0100%, the toughness significantly decreases. Therefore, the S content is set to 0.0100% or less. The S content is preferably 0.0060% or less.

N: 0.0005% to 0.0100%

N is an element that decreases the workability. In addition, N is an element that forms a nitride (TiN and/or NbN) that decreases the formability in the coexistence with Ti and/or Nb and thus reduces the effective amount of Ti and/or Nb. Therefore, the N content may be low. However, when the N content is reduced to less than 0.0005%, the steelmaking cost increases significantly. Therefore, the N content is set to 0.0005% or more. The N content is preferably 0.0010%.

On the other hand, when the N content exceeds 0.0100%, the formability significantly decreases. Therefore, the N content is set to 0.0100% or less. The N content is preferably 0.0060% or less.

The chemical composition of the steel sheet according to the present embodiment may contain the above elements, and the remainder consisting of Fe and impurities. However, for the purpose of improving the properties, the steel sheet may further include one or two or more selected from the group consisting of Ti: 0.20% or less, Mo: 0.300% or less, Nb: 0.200% or less, Cr: 4.000% or less, B: 0.0050% or less, V: 0.300% or less, Ni: 4.00% or less, Cu: 4.00% or less, W: 2.00% or less, Ca: 0.0100% or less, Ce: 0.0100% or less, Mg: 0.0100% or less, Zr: 0.0100% or less, La: 0.0100% or less, REM other than Ce and La: 0.0100% or less, Sn: 1.000% or less, and Sb: 0.200% or less. However, since these elements do not necessarily have to be contained, the lower limit thereof is 0%.

Ti: 0% to 0.200%

Ti is an element that delays recrystallization and contributes to the formation of unrecrystallized ferrite. In addition, Ti is an element that forms carbides and/or nitrides and contributes to the improvement in the strength. Therefore, Ti may be contained in the steel sheet. In a case of obtaining the above effect, the Ti content is preferably set to 0.010% or more.

On the other hand, when the Ti content exceeds 0.200%, the formability decreases. Therefore, the Ti content is set to 0.200% or less. The Ti content is more preferably 0.050% or less.

Mo: 0% to 0.300%

Mo is an element that enhances hardenability and contributes to the control of a martensite fraction. In addition, Mo is an element that segregates to the grain boundaries, suppresses zinc from infiltrating into the structure of a weld during welding, contributes to the prevention of cracking during welding, and also contributes to the suppression of the generation of pearlite during cooling in an annealing step. Therefore, Mo may be contained in the steel sheet. In a case of obtaining the above effect, the Mo content is preferably set to 0.050% or more.

On the other hand, when the Mo content exceeds 0.300%, the formability deteriorates. Therefore, the Mo content is set to 0.300% or less. The Mo content is preferably 0.250% or less.

Nb: 0% to 0.200%

Nb is an element that delays recrystallization and contributes to the formation of unrecrystallized ferrite. In addition, Nb is an element that forms carbides and/or nitrides and contributes to the improvement in the strength. Therefore, Nb may be contained in the steel sheet. In a case of obtaining the above effect, the Nb content is preferably set to 0.010% or more.

On the other hand, when the Nb content exceeds 0.200%, the formability decreases. Therefore, the Nb content is set to 0.200% or less. The Nb content is preferably 0.170% or less.

Cr: 0% to 4.000%

Cr is an element that contributes to the suppression of the generation of pearlite during cooling in an annealing step. Therefore, Cr may be contained in the steel sheet. In a case of obtaining the above effect, the Cr content is preferably set to 0.050% or more.

On the other hand, when the Cr content exceeds 4.000%, the formability decreases. Therefore, the Cr content is set to 4.000% or less. The Cr content is preferably 1.500% or less.

B: 0% to 0.0050%

B is an element that enhances hardenability and contributes to the control of a martensite fraction. In addition, B is an element that segregates to the grain boundaries, suppresses zinc from infiltrating into the structure of a weld during welding, contributes to the prevention of cracking during welding, and also contributes to the suppression of the generation of pearlite during cooling in an annealing step. Furthermore, B also contributes to an improvement in toughness, which is the object of the present invention, through grain boundary strengthening during boundary segregation. Therefore, B may be contained in the steel sheet. In a case of obtaining the above effect, the B content is preferably set to 0.0005% or more.

On the other hand, when the B content exceeds 0.0050%, boride is formed and the toughness decreases. Therefore, the B content is set to 0.0050% or less. The B content is preferably 0.0025% or less.

V: 0% to 0.300%

V is an element that contributes to the improvement in the strength by precipitate strengthening, grain refinement strengthening by suppressing the growth of grains, and dislocation strengthening by suppressing recrystallization. Therefore, V may be contained in the steel sheet. In a case of obtaining the above effect, the V content is preferably set to 0.010% or more.

However, when the V content exceeds 0.300%, carbonitrides are excessively precipitated and the formability decreases. Therefore, the V content is set to 0.300% or less. The V content is preferably 0.150% or less.

Ni: 0% to 4.00%

Ni is an element that suppresses phase transformation at high temperatures and contributes to the improvement in the strength. Therefore, Ni may be contained in the steel sheet. In a case of obtaining the above effect, the Ni content is preferably set to 0.05% or more.

On the other hand, when the Ni content exceeds 4.00%, the weldability decreases. Therefore, the Ni content is set to 4.00% or less. The Ni content is preferably 3.50% or less.

Cu: 0% to 4.00%

Cu is an element that exists as fine particles and contributes to the improvement in the strength. Therefore, Cu may be contained in the steel sheet. In a case of obtaining the above effect, the Cu content is preferably set to 0.01% or more.

On the other hand, when the Cu content exceeds 4.00%, the weldability decreases. Therefore, the Cu content is set to 4.00% or less. The Cu content is preferably 3.50% or less.

W: 0% to 2.00%

W is an element that suppresses phase transformation at high temperatures and contributes to the improvement of strength. Therefore, W may be contained in the steel sheet. In a case of obtaining the above effect, the W content is preferably set to 0.01% or more.

On the other hand, when the W content exceeds 2.00%, hot workability decreases and productivity decreases. Therefore, the W content is set to 2.00% or less. The W content is preferably 1.20% or less.

Ca: 0% to 0.0100%
Ce: 0% to 0.0100%
Mg: 0% to 0.0100%
Zr: 0% to 0.0100%
La: 0% to 0.0100%
REM other than Ce and La: 0% to 0.0100%

Ca, Ce, Mg, Zr, La, and REM other than Ce and La are elements that contribute to the improvement in the formability. Therefore, these elements may be contained in the steel sheet. In a case of obtaining the above effect, the amount of each of the elements is preferably set to 0.0100% or more.

When the amount of Ca, Ce, Mg, Zr, La, and REM other than Ce and La exceeds 0.0100%, there is concern that the ductility may decrease. Therefore, the amount of any of the elements is set to 0.0100% or less. Preferably, the amount of any of the elements is 0.0070% or less.

REM is an abbreviation for Rare Earth Metal and refers to Sc, Y, and elements belonging to lanthanoid series, but Ce and La exhibit the above effects compared to Sc, Y, and other elements belonging to lanthanoid series. Therefore, in the steel sheet according to the present embodiment, Ce and La are excluded from REM. REM is often added to molten steel in a refining process in the form of mischmetal, but each of the elements of REM may be within the above composition range.

Sn: 0% to 1.000%

Sn is an element that suppresses the coarsening of the structure and contributes to the improvement in the strength. Therefore, Sn may be contained in the steel sheet. In a case of obtaining the above effect, the Sn content is preferably set to 0.0005% or more.

On the other hand, when the Sn content exceeds 1.000%, the steel sheet may be excessively embrittled and the steel sheet may fracture during rolling. Therefore, the Sn content is set to 1.000% or less. The Sn content is preferably 0.500% or less.

Sb: 0% to 0.200%

Sb is an element that suppresses the coarsening of the structure and contributes to the improvement of strength. Therefore, Sb may be contained in the steel sheet. In a case of obtaining the above effect, the Sb content is preferably set to 0.0005% or more.

On the other hand, when the Sb content exceeds 0.200%, the steel sheet may be excessively embrittled and the steel sheet may fracture during rolling. Therefore, the Sb content is set to 0.200% or less. The Sb content is preferably 0.100% or less.

The steel sheet of the present embodiment contains, as the chemical composition, essential elements as described above and the remainder consisting of Fe and impurities, and may contain essential elements, optional elements, and a remainder consisting of Fe and impurities. Impurities are elements that are unavoidably incorporated from steel raw materials and/or in a steelmaking process, and are elements that are allowed within the range that does not impair the properties of the steel sheet according to the present embodiment.

Furthermore, as the impurities, H, Na, Cl, Co, Zn, Ga, Ge, As, Se, Tc, Ru, Rh, Pd, Ag, Cd, In, Te, Cs, Ta, Re, Os, Ir, Pt, Au, and Pb may be contained in the steel sheet. The amount of the impurities is allowed in a range of 0.010% or less in total, for example.

Next, the microstructure of the steel sheet according to the present embodiment will be described.

In the steel sheet according to the present embodiment, the strength is increased by causing martensite to be a main structure, and limiting the fractions of ferrite, upper bainite, pearlite, and retained austenite. Furthermore, in the steel sheet according to the present embodiment, by forming plate martensite as a portion of martensite, high strength, low yield stress, large work hardening after yielding, and small work hardening in a high strain region are achieved.

In the steel sheet according to the present embodiment, the microstructure at a ¼ thickness (a range between a ⅛ thickness position (⅛ thickness) in a sheet thickness direction from the surface of the steel sheet and a ⅜ thickness position (⅜ thickness) in the sheet thickness direction from the surface) is limited. The reason for this is that the microstructure between the ⅛ thickness and the ⅜ thickness with a ¼ thickness position in the sheet thickness direction from the surface of the steel sheet as a center position in the sheet thickness direction is a representative structure of the entire steel sheet and correlates with the mechanical properties of the entire steel sheet. Therefore, in the present embodiment, the range in the sheet thickness direction for specifying the microstructural fraction is set to "the ⅛ thickness to the ⅜ thickness with the ¼ thickness as the center position in the sheet thickness direction". In addition, "%" in a case of expressing the microstructural fraction is an area ratio.

Ferrite: 0% to 10%

Since the steel sheet according to the present embodiment is intended for a high strength steel sheet, soft ferrite may not be present. In a case where ductility is required and the strength may be reduced, ferrite may be allowed to be present. However, when the ferrite fraction exceeds 10%, it becomes difficult to secure the required strength, or the amount of work hardening after yielding becomes small. Therefore, even in a case where ferrite is contained, the ferrite fraction (area ratio) is set to 10% or less. The ferrite fraction is preferably 8% or less. The reason why the amount of work hardening after yielding decreases as the ferrite fraction increases is not clear, but the reason for this is considered to be as follows. Since work hardening occurs when dislocations are entangled, it is considered that when ferrite having a low dislocation density at an initial stage of working is present in a large proportion, the amount of work hardening at the initial stage of working becomes small.

Retained Austenite: 0% to 10%

It is effective to use retained austenite subsidiarily in terms of securing elongation, but retained austenite causes hydrogen cracking depending on the conditions of use. In addition, the presence of retained austenite increases the amount of work hardening at a high strain. Therefore, the retained austenite fraction is set to 10% or less. The retained austenite fraction may be 7% or less. The lower limit of the retained austenite fraction includes 0%. The retained austenite fraction may be 2% or more.

Martensite (Fresh Martensite and Tempered Martensite): 70% to 100%

In the steel sheet according to the present embodiment, the area ratio of martensite is set to 70% or more in order to secure the strength. The term "martensite" herein is a general term for fresh martensite that does not contain iron-based carbides and tempered martensite that contains iron-based carbides. Therefore, in a case where the steel sheet according to the present embodiment contains both fresh martensite and tempered martensite, the area ratio of martensite is the sum of the area ratios of both. In a case where the steel sheet according to the present embodiment contains only one of fresh martensite and tempered martensite, the area ratio thereof is 70% to 100%. In the following, fresh martensite and tempered martensite are simply referred to as martensite in a case where distinguishment therebetween is not particularly necessary. When the area ratio of martensite is less than 70%, it becomes difficult to secure the required strength. More preferably, the area ratio of martensite is 80% or more. The higher the martensite fraction, the higher the strength. Therefore, the martensite fraction may be adjusted so as to achieve the target strength, and the upper limit of the martensite fraction is 100%.

Martensite Contains Plate Martensite, and Area Ratio of Plate Martensite to Entire Structure Is 10% to 35%

By the presence of plate martensite as a portion of martensite, low yield stress, large work hardening after yielding, and small work hardening in a high strain region can be achieved. Plate martensite is fresh martensite and/or tempered martensite, which has a small intragranular orientation difference and is elongated. When the area ratio of plate martensite is less than 10% of the entire structure constituting the steel sheet, the effect is insufficient. Therefore, the area ratio of plate martensite to the entire structure is set to 10% or more. It is considered that the more the amount of plate martensite, the better, and the upper limit thereof does not have to be set. However, according to the examination by the inventors, the upper limit thereof is substantially about 35%, so that the upper limit thereof may be set to 35%.

In the present embodiment, plate martensite is plate-like martensite, and is distinguished from other shapes of martensite through electron backscatter diffraction (EBSD) measurement and kernel average misorientation (KAM) analysis. As a result of the EBSD measurement and KAM analysis, a region having a minor axis of 1.0 μm or longer and an aspect ratio of 1.5 or more in a region having a local orientation difference of 1.0° or less is the plate martensite.

As described in Non-Patent Document 1 and Non-Patent Document 2, it is known that there are various morphologies of martensite in iron-based alloys. In a low carbon alloy steel having a low C content, martensite having a fine and elongated morphology called "lath" (lath martensite) is generally obtained. Lath martensite is extremely fine (the minor axis is about 0.2 μm) compared to plate martensite. Therefore, plate martensite is clearly distinguished from lath martensite.

The steel sheet according to the present embodiment has a low C content, but has plate martensite in addition to lath martensite, which is different from general martensite steel.

Furthermore, as generally known morphologies of martensite, for example, a butterfly shape, a lens shape, and a thin sheet shape are known. However, these forms of martensite are generated in a case where the C content is high or steel containing a large amount of Ni and the like is transformed at a temperature as low as room temperature or lower. According to Non-Patent Document 2, the thin sheet-shaped martensite can be obtained, for example, by transformation of a portion of austenite matrix of an Fe—Ni—C alloy or an Fe—Ni—Co—Ti alloy in a temperature range of −100° C. or lower. As described above, plate martensite is clearly distinguished from martensite having a butterfly shape, lens shape, or thin sheet shape.

Upper Bainite: 0% to 10%

Upper bainite is softer than martensite. When a large amount of upper bainite is present, the plate martensite fraction decreases. Therefore, the upper limit thereof is set to 10%. The upper bainite fraction is preferably 6% or less. Since upper bainite does not have to be included, the lower limit of the upper bainite fraction is 0%. However, the upper bainite fraction may be, for example, 2% or more.

Pearlite: 0% to 5%

Pearlite is softer than martensite. In addition, pearlite is a composite structure of cementite and ferrite, but greatly deteriorates the toughness. Therefore, the pearlite fraction is limited to 5% or less. The pearlite fraction is preferably 1% or less. Since pearlite does not have to be included, the lower limit of the pearlite fraction is 0%. However, the pearlite fraction may be, for example, 2% or more.

A method of calculating the area ratio of each structure will be described.

A sample with a sheet thickness cross section parallel to a rolling direction of the steel sheet as an observed section is collected, and the observed section is polished and subjected to nital etching. The observed section after the nital etching is observed with an optical microscope or a scanning electron microscope (SEM). The area ratio of each structure is calculated by a taken image or an image analysis software in the device. One visual field in the image is set to 200 μm in length and 200 μm or more in width, the area ratio of each structure is calculated from each image for 10 or more different visual fields, the average value thereof is obtained, and the average value is determined to be the area ratio.

When calculating the area ratio, a flat region that is recessed from the martensite structure, has no lower structure, and has few irregularities is determined to be ferrite. In addition, a structure that is recessed from the martensite structure like ferrite, has a morphology with elongated laths or a block-shaped morphology, and has carbides and retained austenite present between laths and blocks is determined to be upper bainite.

Since pearlite presents a lamellar structure in which ferrite and cementite are layered, the lamellar region is determined to be pearlite. Pseudo-pearlite with layered cementite that is cut in the middle is also pearlite in the present embodiment.

In addition, in regions other than ferrite, upper bainite, and pearlite in the entire structure, a region where iron-based carbides are observed is determined to be tempered martensite.

In the regions other than ferrite, upper bainite, and pearlite, a region where iron-based carbides are not observed is determined to be fresh martensite or retained austenite. Since both fresh martensite and retained austenite have flat structures, distinguishment therebetween by SEM is difficult. Therefore, the area ratio of retained austenite obtained by an X-ray diffraction method, which will be described later, is obtained, and the fresh martensite fraction is determined by subtracting the area ratio of retained austenite obtained by the X-ray diffraction method described later from the total area ratio of the regions of fresh martensite and retained austenite.

The area ratio of retained austenite can be measured by the X-ray diffraction method. Specifically, using Mo-Kα radiation, the diffraction intensity (α(111)) of the (111) plane of ferrite, the diffraction intensity (γ(200)) of the (200) plane of retained austenite, the diffraction intensity (α(211)) of the (211) plane of ferrite, and the diffraction intensity (γ(311)) of the (311) plane of retained austenite are measured, and the area ratio (fA) of retained austenite is calculated by the following expression.

$$fA = (2/3)\{100/(0.7 \times \alpha(111)/\gamma(200)+1)\} + (1/3)\{100/(0.78 \times \alpha(211)/\gamma(311)+1)\}$$

The area ratio of plate martensite can be obtained by the following method. As described above, plate martensite is included in martensite (fresh martensite and tempered martensite).

The area ratio of plate martensite is obtained by observing a sheet thickness direction cross section parallel to the rolling direction, performing EBSD measurement on a ¼ thickness position (¼ thickness) as the center from the surface of the sheet thickness, performing KAM analysis, determining martensite having a minor axis of 1.0 μm or longer and an aspect ratio of 1.5 or more to be plate martensite in a region having a local orientation difference of 1.0° or less, and measuring the area ratio thereof After the EBSD measurement, nital etching is further performed and the same visual field is observed with the SEM, whereby the martensite and other structures can be distinguished in the visual field on which the EBSD measurement is performed.

In the EBSD measurement, a measurement area of 200 μm×200 μm is measured at a pitch of 0.2 μm.

Average Grain Size of Prior Austenite Grains is 2.0 μm to 10.0 μm

The smaller the average grain size of the prior austenite grains, the better the toughness. Therefore, the average grain size of the prior austenite grains is preferably small. However, when the average grain size of the prior austenite grains is less than 2.0 μm, plate martensite cannot exist. The reason for this is not clear, but it is considered that when the grain of austenite matrix is shear-transformed into plate martensite, the grains have a certain size, and when the grain of austenite matrix is too small, intragranular transformation cannot be achieved. Therefore, the average grain size of the prior austenite grains is set to 2.0 μm or more. The average grain size of prior austenite is preferably 5.0 μm or more.

On the other hand, as the average grain size of the prior austenite grains increases, the toughness decreases. In particular, when the average grain size exceeds 10.0 μm, a brittle-ductile transition temperature in a toughness test described later becomes room temperature (25° C.) or higher. Therefore, the average grain size of the prior austenite grains is set to 10.0 μm or less. The average grain size of prior austenite is preferably 8.0 μm or less.

The prior austenite grains are austenite crystal grains in the austenite structure before being transformed into the martensite, and are formed in an annealing step described later. The prior austenite grains can be observed by SEM. In a case where ferrite is present, the ferrite is present at the place that was the grain boundary of austenite matrix, so that the boundary between ferrite and martensite is defined as a prior austenite grain boundary.

Maximum Diameter of Prior Austenite Grains is 20.0 μm or Less

Not only the average grain size of the prior austenite grains, but also the maximum diameter is important for toughness. Even if the average grain size is small, in a case where there are large grains, the grains are easily fractured, resulting in low toughness. When the maximum diameter of the prior austenite grains exceeds 20.0 gm, the toughness greatly decreases. Therefore, the maximum diameter of the prior austenite grains is set to 20.0 μm or shorter. The maximum diameter of the prior austenite grains is preferably 17.0 μm or shorter.

The average grain size and maximum diameter of the prior austenite grains are measured as follows.

By holding the steel sheet at 450° C. for 24 hours, P is concentrated at the grain boundaries of prior austenite. Thereafter, the grain boundaries are preferentially corroded by corroding the sheet thickness direction cross section parallel to the rolling direction with nital. Thereafter, in a range of 500 μm×1000 μm with a ¼ thickness position (¼ thickness) from the surface of the sheet thickness as the center, the length of each grain in the rolling direction and the length thereof in the sheet thickness direction perpendicular thereto are measured by the SEM, the average value of the measured lengths is determined to be the average grain size, and the maximum length measured in the observed range is determined to be the maximum diameter.

Amount of Solid Solution C in Martensite is 0.20 mass % or Less

When the amount of solid solution C in martensite is large, the amount of work hardening in a high strain region increases. The reason is not clear, but it is considered that solid solution C becomes a resistance to the movement of dislocations during processing, but the dislocations increase in amount and are likely to be accumulated as the strain increases. Therefore, when the amount of solid solution C is large, the amount of work hardening increases. When the amount of solid solution C exceeds 0.20 mass %, the amount of work hardening in a high strain region increases. Therefore, the upper limit of the amount of solid solution C in martensite is set to 0.20 mass %. The amount of solid solution C in martensite is preferably 0.15 mass % or less.

The amount of solid solution C can be obtained according to the method described in PCT International Publication No. WO2018/139400. Specifically, the amount of solid solution C is obtained by the following method.

The amount of solid solution C in martensite is obtained by subtracting the C content in carbides precipitated in the steel from the C content of the chemical composition of the steel and further considering the effect of the microstructural fraction.

Specifically, by using the Fe concentration $<Fe>a$, the Cr concentration $<Cr>a$, the Mn concentration $<Mn>a$, the Mo concentration $<Mo>a$, the V concentration $<V>a$, and the Nb concentration $<Nb>$ in carbides (cementite and MC-type carbides) obtained as residues by performing an extraction residue analysis with a mesh size of 100 nm, and the Fe concentration $<Fe>b$, the Cr concentration $<Cr>b$, the Mn concentration $<Mn>b$, and the Mo concentration $<Mo>b$ in cementite obtained by performing a point analysis through an energy dispersive X-ray spectroscopy (EDS) on cementite specified by observing a replica film obtained by an extraction replica method by a transmission electron microscope (TEM), the amount of solid solution C is obtained by Expressions (a) to (f).

$$<Mo>c=(<Fe>a+<Cr>a+<Mn>a)\times<Mo>b/(<Fe>b+<Cr>b+<Mn>b) \quad (a)$$

$$<Mo>d=<Mo>a-<Mo>c \quad (b)$$

$$<C>a=(<Fe>a/55.85+<Cr>a/52+<Mn>a/53.94+<Mo>c/95.9)/3\times12 \quad (c)$$

$$<C>b=(<V>a/50.94+<Mo>d/95.9+<Nb>a/92.9)\times12 \quad (d)$$

$$<C>\text{all}=<C>-(<C>a+<C>b) \quad (e)$$

$$(\text{amount of solid solution C})=\{<C>\text{all}-(fF+fB+fP)\times 0.02+f\gamma\times0.8\}/fM \quad (f)$$

Here, $<C>a$ and $<C>b$ respectively represent the C content obtained from the extraction residue analysis result and the C content obtained from the measurement result of the replica film.

(amount of solid solution C) represents the amount of solid solution C in martensite, and fF, fB, fP, fγ, and fM respectively represent the fractions (area %) of ferrite, bainite, pearlite, retained austenite, and martensite. In Expression (f), the solid solubility limit of ferrite, bainite, and pearlite in a BCC phase is assumed to be 0.02 mass %, and furthermore, the amount of C in retained austenite is assumed to be 0.8 mass %.

In the measurement, for the C content of the chemical composition of the steel, a faceted analysis sample is collected by shaving the surface of the steel sheet by 200 μm from the surface and rear surfaces of the sheet for the purpose of removing a decarburized layer. Then, the C content (mass %) is analyzed by a well-known combustion-infrared absorption method in an oxygen current. This is determined to be the C content (<C>) of the steel. For a sample for the extraction residue analysis, a disk-shaped test piece having a diameter of 50 mm is collected by shaving the surface of the sheet by 200 μm for the purpose of removing the decarburized layer, and then measured. For a sample for the TEM observation and the point analysis of cementite through the EDS, a sample collected from a ¼ thickness position is used. 30 cementite grains are measured.

Average Carbide Size (Equivalent Circle Diameter) in Martensite is 0.25 μm or Shorter The larger the average carbide size in martensite, the smaller the work hardening after yielding. Therefore, the average carbide size is set to 0.25 μm or shorter by equivalent circle diameter. The average carbide size in martensite is preferably 0.20 μm or shorter by equivalent circle diameter.

Carbides in martensite include $Fe_3C$ (θ carbide), ε carbide, and the like.

The average size (equivalent circle diameter) of carbides can be obtained by observing a mirror-polished sample with a scanning electron microscope (SEM). In examples described later, results observed by SEM are shown. The measurement is performed in a region of 500 μm×500 μm or more, and the average carbide size is determined by measuring the number of carbide particles and the equivalent circle diameters thereof in the region.

Crystal Orientation Difference between Plate Martensite and Another Martensite Adjacent to Plate Martensite in Same Prior Austenite Grain is 10.0° or Less When the crystal orientation difference between plate martensite and another martensite adjacent to the plate martensite exceeds 10.0°, the yield stress increases. The reason is not clear, but it is considered that when the crystal orientation difference between plate martensite and another martensite adjacent to the plate martensite is large, dislocations are less likely to move across boundaries, and plastic deformation is less likely to propagate, resulting in a difficulty in yielding. That is, it is considered that as plate martensite that is likely to undergo plastic deformation and martensite (lath-shaped, butterfly-shaped, lens-shaped, or thin sheet-shaped martensite) other than plate martensite in which plastic deformation is likely to propagate are adjacent to each other, plastic deformation efficiently propagates even at a low stress, so that the yield stress decreases. From this viewpoint, the effect of the present invention cannot be obtained with plate martensite surrounded by grain boundaries having a crystal orientation difference of more than 10°. When identifying plate martensite by EBSD measurement and SEM observation, the crystal orientation difference from the surrounding martensite region other than the plate martensite is measured, and the minimum crystal orientation difference may be 10.0° or less.

P Concentration at Prior Austenite Grain Boundaries is 4.0 at % or Less

P segregates to grain boundaries and reduces the toughness. When the P concentration at the prior austenite grain boundaries exceeds 4.0 at %, the toughness greatly decreases. Therefore, the P concentration at the prior austenite grain boundaries is set to 4.0 at % or less. The P concentration at the prior austenite grain boundaries is preferably 3.2 at %.

The P concentration of the prior austenite grain boundaries is measured by Auger spectroscopy. A sample is cooled with liquid nitrogen in a vacuum chamber to a temperature of −150° C. or lower, and then the sample is fractured to expose grain boundaries. The P concentration on the surface where the grain boundaries are exposed is measured and quantified using, for example, an analysis software attached to FE-AES manufactured by JEOL Ltd. in 2010.

The steel sheet according to the present embodiment may have a hot-dip galvanized layer on its surface by being hot-dip galvanized. By the hot-dip galvanized layer provided in the steel sheet according to the present embodiment, the corrosion resistance is improved, which is preferable. In addition, the hot-dip galvanized layer may be a hot-dip galvannealed layer. When the hot-dip galvanized layer is a hot-dip galvannealed layer, in addition to the corrosion resistance, the number of continuous spots that can be formed during spot welding increases.

The hot-dip galvannealed layer may be a plating layer obtained by alloying a hot-dip galvanized layer formed under normal plating conditions (including a plating layer formed by hot-dip plating with a zinc alloy) under normal alloying treatment conditions.

The plating adhesion amount of the hot-dip galvannealed layer is not particularly limited to a specific amount, but is preferably 5 $g/m^2$ or more, and more preferably 20 $g/m^2$ or more per surface in terms of securing the required corrosion resistance.

In the galvannealed steel sheet of the present embodiment, upper layer plating (for example, Ni plating) may be further applied onto the hot-dip galvannealed layer for the purpose of improving coatability and weldability. Furthermore, various treatments such as a chromate treatment, a phosphate treatment, a lubricity improvement treatment, and a weldability improvement treatment may be performed for the purpose of improving the surface properties of the hot-dip galvannealed layer.

The sheet thickness of the steel sheet according to the present embodiment is not particularly limited, but is preferably 0.10 to 11.0 mm. A high strength thin steel sheet having a sheet thickness of 0.10 to 11.0 mm is suitable as a base steel sheet for a member for a vehicle manufactured by press working. In addition, the high strength thin steel sheet having the above-mentioned sheet thickness can be easily manufactured on a thin sheet manufacturing line.

Next, a method for manufacturing the steel sheet according to the present embodiment will be described.

The present inventors examined a manufacturing method capable of stably manufacturing the steel sheet according to the present embodiment. As a result, it was found that in order to obtain plate martensite, it is necessary to study a heating rate during heating, cooling after heating to an austenite single phase region, stress application, and the like.

It was also found that by controlling the cooling after heating to the austenite single phase region, upper bainitic transformation can be suppressed, and martensite (fresh martensite and/or tempered martensite) can be the main structure.

The manufacturing method for manufacturing the steel sheet of the present embodiment can be obtained by a manufacturing method including the following steps.

(I) A casting step of casting a molten steel obtained by melting a steel having the above-mentioned composition to obtain a steel piece.

(II) A hot rolling step of heating the steel piece to 1150° C. or higher and 1350° C. or lower, and thereafter hot rolling the steel piece in a temperature range of 1050° C. or higher at a cumulative rolling reduction of 35% or more to obtain a hot-rolled steel sheet.

(III) A cooling step of performing cooling, which is started within three seconds after the completion of the hot rolling step, to a coiling temperature so that an average cooling rate in a temperature range of 850° C. or lower and higher than 700° C. is 20° C./sec to 100° C./sec and an average cooling rate from 700° C. to the coiling temperature is 30° C./sec to 80° C./sec.

(IV) A coiling step of coiling the hot-rolled steel sheet after the cooling step at a coiling temperature of 650° C. or lower.

(V) A cold rolling step of performing cold rolling on the hot-rolled steel sheet after the coiling step to obtain a cold-rolled steel sheet.

(VI) An annealing step of heating the cold-rolled steel sheet to an annealing temperature of Ac3 to 1000° C. so that an average heating rate in a temperature range of 650° C. to 750° C. is 0.5 to 5.0° C./sec, and performing holding at the annealing temperature for 3 to 100 seconds.

(VII) A post-annealing cooling step of cooling the cold-rolled steel sheet after the annealing step so that an average cooling rate in a temperature range of 740° C. or lower and higher than 550° C. is 10° C./sec or faster, an average cooling rate in a temperature range of 550° C. or lower and higher than Ms° C. is 30° C./sec or faster, an average cooling rate in a temperature range of Ms° C. or lower and higher than Ms-15° C. is 5° C./sec to 40° C./sec, an average cooling rate in a temperature range of Ms-15° C. or lower and higher than Ms-40° C. is 25° C./sec to 120° C./sec, and an average cooling rate in a temperature range of Ms-40° C. to Ms-120° C. is 5° C./sec to 40° C./sec.

Here, in the post-annealing cooling step, a tensile stress of 20 to 100 MPa is applied to the cold-rolled steel sheet in a temperature range of Ms° C. to Ms-120° C.

(VIII) A final cooling step of cooling the cold-rolled steel sheet in the post-annealing cooling step to room temperature at an average cooling rate of 0.5° C./sec or faster and 10° C./sec.

Ac3 is the austenitic transformation temperature(° C.) at the time of heating, and Ms is the martensitic transformation start temperature (° C.).

Hereinafter, conditions of each step will be described.

[Casting Step]

In the casting step, molten steel having the same chemical composition as the steel sheet according to the present embodiment is cast to obtain a steel piece. As for the melting method and the casting method, normal methods may be used.

[Hot Rolling Step]

In the hot rolling step, the steel piece (hereinafter, the steel piece may be referred to as a slab or a cast slab) is heated to 1150° C. to 1350° C., and thereafter hot-rolled at a cumulative rolling reduction of 35% or more in a temperature range of 1050° C. or higher to obtain a hot-rolled steel sheet. When the heating temperature of the slab is lower than 1150° C., the homogenization of the cast slab and the melt of carbonitrides are insufficiently achieved, resulting in a decrease in strength and a decrease in toughness. Therefore, the heating temperature of the cast slab is set to 1150° C. or higher. The heating temperature of the slab is preferably 1180° C. or higher.

On the other hand, when the heating temperature of the slab exceeds 1350° C., the manufacturing cost increases and the productivity decreases. In addition, the grain size of austenite matrix is locally increased to form a duplex grain structure, and the maximum diameter of the prior austenite grains in the final structure is increased. Therefore, the heating temperature of the slab is set to 1350° C. or lower. The heating temperature of the slab is preferably 1300° C. or lower.

In addition, hot rolling with a cumulative rolling reduction of 35% or more is performed in a temperature range of 1050° C. or higher. Recrystallization quickly proceeds at 1050° C. or higher. By performing rolling with a cumulative rolling reduction of 35% or more in the temperature range, recrystallization proceeds after the hot rolling and the grain size decreases. Accordingly, the grain size after cold rolling and annealing also decreases. The cumulative rolling reduction in the temperature range of 1050° C. or higher is preferably 40% or more.

[Cooling Step]

Cooling is started within three seconds after the hot rolling step is completed. When the steel sheet after the hot rolling is maintained at a high temperature, recrystallization and grain growth proceed. Therefore, when the time until the start of cooling is long, the retention time at a high temperature becomes long, and the grain growth proceeds too much. As a result, the average size of the grains of the austenite matrix and the maximum diameter of the grains of the austenite matrix increase. In this case, the average grain size and the maximum diameter of the prior austenite grains in the final structure increase. Therefore, the time from the completion of the hot rolling step to the start of cooling is set to three seconds or shorter. The completion of the hot rolling step refers to the time point at which rolling by the final rolling roll in the hot rolling step is ended. In addition, the above-mentioned cooling start time point refers to the time point at which the following cooling is started.

In the cooling step, cooling to a coiling temperature is performed so that an average cooling rate in a temperature range of 850° C. or lower and higher than 700° C. is 20° C./sec to 100° C./sec, and an average cooling rate from 700° C. to a coiling temperature is 30 to 80° C./sec.

When the average cooling rate in the temperature range of 850° C. or lower and higher than 700° C. is slow, austenite matrix undergoes ferritic transformation. As a result, the metallographic structure of the hot-rolled steel sheet becomes an inhomogeneous structure in which ferrite, bainite, martensite, and the like are present in a composite manner. In this case, this inhomogeneous structure also affects the structure after the final heat treatment, so that the structure after the heat treatment also becomes inhomogeneous. As a result, the maximum diameter of the prior austenite grains increases.

When the average cooling rate in the temperature range of 850° C. or lower and higher than 700° C. is slower than 20° C./sec, the ferritic transformation is likely to proceed. Therefore, the average cooling rate in this temperature range is set to 20° C./sec or faster. The average cooling rate in the temperature range of 850° C. or lower and higher than 700° C. is preferably 40° C./sec or faster.

On the other hand, when the average cooling rate in the temperature range of 850° C. or lower and higher than 700° C. exceeds 100° C./sec, the unevenness of the cooling rate increases, and the deviation of the behavior of thermal expansion and thermal contraction depending on the location increases, resulting in a poor sheet shape. Therefore, the average cooling rate is set to 100° C./sec or slower. The average cooling rate in the temperature range of 850° C. or lower and higher than 700° C. is preferably 85° C./sec or slower.

In addition, in the cooling step, the average cooling rate from 700° C. to the coiling temperature described later is set to 30° C./sec to 80° C./sec. In this temperature range, the boundary segregation of P proceeds. When the average cooling rate from 700° C. to the coiling temperature is slower than 30° C./sec, the degree of boundary segregation of P increases and the toughness deteriorates. The average cooling rate from 700° C. to the coiling temperature is preferably 40° C./sec or faster.

On the other hand, when the average cooling rate from 700° C. to the coiling temperature exceeds 80° C./sec, there are cases where the unevenness of the cooling rate increases, and the deviation of the behavior of thermal expansion and thermal contraction depending on the location increases. As a result, the shape of the sheet is often deteriorated. Therefore, the average cooling rate is set to 80° C./sec or slower. The average cooling rate from 700° C. to the coiling temperature is preferably 75° C./sec or slower.

[Coiling Step]

The cooled hot-rolled steel sheet is coiled at a coiling temperature of 650° C. or lower. When the coiling temperature exceeds 650° C., cementite becomes coarse, and coarse carbides remain even after annealing. In addition, when the coiling temperature exceeds 650° C., coarse ferrite is likely to be generated at the time of coiling, and due to the influence, coarse austenite matrix is generated. In this case, the average grain size of the prior austenite grains after annealing and the maximum diameter of prior austenite increase. Therefore, the coiling temperature is set to 650° C. or lower. The coiling temperature is preferably 630° C. or lower, and more preferably 580° C. or lower. The lower limit of the coiling temperature is not particularly set. However, when the coiling temperature is lower than 400° C., the strength of the hot-rolled steel sheet increases too much and the rolling load in the cold rolling of the subsequent step increases. Therefore, the coiling temperature is preferably 400° C. or higher.

[Cold Rolling Step]

The hot-rolled steel sheet after the coiling step is pickled as necessary and then cold-rolled to obtain a cold-rolled steel sheet.

Pickling and cold rolling may be performed according to a normal method. For example, the cold rolling is performed at a rolling reduction of 30% to 85%.

[Annealing Step]

In the annealing step, annealing is performed in which the cold-rolled steel sheet is heated to an annealing temperature of Ac3 to 1000° C. at an average heating rate of 0.5 to 5.0° C./sec in a temperature range of 650° C. to 750° C. and held at the annealing temperature for 3 to 100 seconds.

The temperature range of 650° C. to 750° C. is a temperature range in which recovery and recrystallization proceed. By the recovery and recrystallization that have appropriately proceeded, a uniform ferrite structure is formed, whereby nucleation of γ (austenite) occurs uniformly during heating to an austenite single phase region, and coarse austenite grains are not generated. In a case where coarse grains of austenite matrix are present, the fraction of plate martensite generated in the post-annealing cooling step of the subsequent steps decreases. The reason for this is not clear, but the following can be considered, for example. In the post-annealing cooling step, the cold-rolled steel sheet contracts due to a temperature change, so that stress is generated in the cold-rolled steel sheet. When coarse austenite matrix is present, the coarse austenite matrix is preferentially deformed by the stress. Therefore, plate martensite is generated only from the coarse austenite matrix, and the plate martensite fraction decreases.

In a case where the average heating rate in the temperature range of 650° C. to 750° C. is slower than 0.5° C./sec, the number of coarse grains of austenite matrix increases and the plate martensite fraction decreases. In addition, the presence of coarse austenite matrix causes an increase the average grain size of prior austenite and a decrease in the toughness. Therefore, the average heating rate in the above temperature range is set to 0.5° C./sec. The average heating rate in the temperature range of 650° C. to 750° C. is preferably 1.0° C./sec or faster.

On the other hand, even in a case where the average heating rate in the temperature range of 650° C. to 750° C. exceeds 5° C./sec, the plate martensite fraction decreases. It is presumed that this is because the recrystallization of ferrite does not proceed, and grains of austenite matrix that reflect the shape of the grains flattened by cold rolling become coarse, so that the plate martensite fraction decreases. In addition, in a case where the average heating rate exceeds 5° C./sec, the prior austenite grain size also increases, so that the toughness deteriorates. Therefore, the average heating rate in the temperature range of 650° C. to 750° C. is set to 5° C./sec or faster. The average heating rate in the temperature range of 650° C. to 750° C. is preferably 4.0° C./sec or slower.

The annealing temperature is Ac3 to 1000° C. By heating the steel sheet after the cold rolling to the austenite single phase region, the martensite fraction can be increased. When the annealing temperature is lower than Ac3, an austenite single phase structure cannot be obtained stably. The annealing temperature is preferably (Ac3+20)° C. or higher.

On the other hand, when the annealing temperature exceeds 1000° C., the grains of austenite matrix become large, and the prior austenite grains forming the structure of the steel sheet, which is the final product, become coarse, resulting in the deterioration of the toughness or a decrease in the amount of plate martensite. The annealing temperature is preferably 950° C. or lower.

When the retention time at the annealing temperature is shorter than three seconds, the austenite single phase cannot be stably obtained. Therefore, the retention time at the annealing temperature is set to three seconds or longer. The retention time at the annealing temperature is preferably 25 seconds or longer.

On the other hand, when the retention time at the annealing temperature exceeds 100 seconds, the grain size of austenite matrix increases while the cold-rolled steel sheet is held at the annealing temperature, and the prior austenite grains forming the structure of the steel sheet which is the final product become coarse, resulting in the deterioration of the toughness or a reduction in the amount of plate martensite. Therefore, the retention time at the annealing temperature is set to 100 seconds or shorter. The retention time at the annealing temperature is preferably 80 seconds or shorter.

The austenitic transformation temperature Ac3 is calculated by the following expression.

$$Ac3(° C.)=910-230 \times C^{1/2}-15.2 \times Ni+44.7 \times Si+31.5 \times Mo+104 \times V+13.1 \times W$$

Here, in the above expression, C, Ni, Si, Mo, V, and W are the amounts (mass %) of the corresponding elements in the steel piece.

[Post-Annealing Cooling Step]

In the post-annealing cooling step, it was found that the steel sheet after the annealing in the temperature range of Ac3 to 1000° C. may be cooled by controlling the cooling rates in stages as follows.

Average Cooling Rate in Temperature Range of 740° C. or Lower and Higher than 550° C.: 10° C./sec or Faster By controlling the cooling rate in this temperature range, ferritic transformation can be suppressed and martensite can be the main structure. When the average cooling rate is slower than 10° C./sec, there is concern that ferritic transformation may occur. The average cooling rate in this temperature range is preferably 20° C./sec or faster. The upper limit of the average cooling rate is not particularly limited, but for example, the average cooling rate in this temperature range is 80° C./sec or slower.

Average Cooling Rate in Temperature Range of 550° C. or Lower and Higher than Ms° C.: 30° C./sec or Faster By controlling the cooling rate in this temperature range, the upper bainitic transformation can be suppressed and martensite can be the main structure. When the average cooling rate is slower than 30° C./sec, the area of upper bainite increases, and the area ratio of martensite in the final steel sheet decreases. The average cooling rate in this temperature range is preferably 40° C./sec or faster. The upper limit of the average cooling rate is not particularly limited, but for example, the average cooling rate in this temperature range is 80° C./sec or slower.

Average Cooling Rate in Temperature Range of Ms° C. or Lower and Higher than Ms-15° C.: 5° C./sec to 40° C./sec By controlling the cooling rate in this temperature range, the area ratio of the desired plate martensite can be secured. In order to cause plate martensite to be sufficiently generated in this temperature range, the average cooling rate in this temperature range is set to 40° C./sec or slower. When the average cooling rate in this temperature range exceeds 40° C./sec, the amount of plate martensite becomes less than 10%. The average cooling rate in this temperature range is preferably 30° C./sec or slower, and more preferably 20° C./sec or slower. However, when the average cooling rate in this temperature range is slower than 5° C./sec, the upper bainitic transformation proceeds and the area ratio of the upper bainite increases. Therefore, the average cooling rate in this temperature range is set to 5° C./sec or faster. The average cooling rate in a temperature range of lower than Ms° C. and Ms-15° C. or higher is preferably 10° C./sec or faster.

Average Cooling Rate in Temperature Range of Ms-15° C. or Lower and Higher than Ms-40° C.: 25° C./sec to 120° C./sec In this temperature range, when plate martensite is present, bainitic transformation with the plate martensite as the nucleus is likely to occur. Therefore, the bainitic transformation is suppressed by setting the average cooling rate in this temperature range to 25° C./sec or faster. The average cooling rate in this temperature range is preferably 40° C./sec or faster.

On the other hand, when the average cooling rate exceeds 120° C./sec, the crystal orientation difference at the interface between plate martensite and martensite of other shapes increases. Therefore, the average cooling rate is set to 120° C./sec or slower. The average cooling rate in this temperature range is preferably 40° C./sec or slower.

Average Cooling Rate in Temperature Range of Ms-40° C. to Ms-120° C.: 5° C./sec to 40° C./sec When the average cooling rate in this temperature range exceeds 40° C./sec, the amount of carbides precipitated in martensite decreases, so that the amount of solid solution C in martensite increases. Therefore, the average cooling rate is set to 40° C./sec or slower. The average cooling rate in this temperature range is preferably 30° C./sec or slower, and more preferably 20° C./sec or slower.

On the other hand, when the average cooling rate in this temperature range is slower than 5° C./sec, the size of the carbides increases. Therefore, the average cooling rate is set to 5° C./sec or faster. The average cooling rate in this temperature range is preferably 10° C./sec or faster.

As described above, by controlling the cooling rate after heating to the austenite single phase region in stages, the generation of structures other than martensite is suppressed, and a structure primarily containing martensite containing an appropriate amount of plate martensite can be obtained. In particular, by performing rapid cooling until the start of martensitic transformation to suppress nucleation of bainite and lowering the cooling rate immediately after the start of martensitic transformation to allow nucleation of plate martensite to sufficiently occur, the generation of plate martensite can be efficiently promoted. From this viewpoint, the average cooling rate in a temperature range of Ms° C. or lower and higher than Ms-15° C. is preferably 0.70 or less times, and more preferably 0.50 or less times the average cooling rate in a temperature range of 550° C. or lower and higher than Ms° C.

In addition, in the post-annealing cooling step, a tensile stress of 20 to 100 MPa is applied to the cold-rolled steel sheet in a temperature range of Ms° C. to Ms-120° C. By applying the tensile stress to the cold-rolled steel sheet in addition to the cooling pattern as described above, it is possible to facilitate the formation of plate martensite. In order to obtain the effect, the tensile stress is set to 20 MPa or more. The tensile stress on the cold-rolled steel sheet in the temperature range of Ms° C. to Ms-120° C. is preferably 30 MPa or more.

On the other hand, when the tensile stress is too high, the sheet shape often collapses. It is considered that this is because the yield stress decreases in a high temperature state during a heat treatment, and the sheet undergoes plastic deformation when a tensile stress is applied thereto. When the tensile stress exceeds 100 MPa, the sheet shape may be deformed. Therefore, the tensile stress is set to 100 MPa or less. The tensile stress on the cold-rolled steel sheet in the temperature range of Ms° C. to Ms-120° C. is preferably 85 MPa or less.

[Final Cooling Step]

In the post-annealing cooling step, cooling to Ms-120° C. is performed. Thereafter, the cold-rolled steel sheet is cooled to room temperature. When cooling to room temperature, the average cooling rate at lower than Ms-120° C. is set to 0.5° C./sec to 10° C./sec. When the average cooling rate at Ms-120° C. or lower exceeds 10° C./sec, the time for carbide precipitation may be reduced and the amount of solid solution C may be increased. The average cooling rate at lower than Ms-120° C. is preferably 6.0° C./sec or slower.

On the other hand, when the average cooling rate is slower than 0.5° C./sec, there is concern that carbides may become large. Therefore, the average cooling rate at lower than Ms-120° C. is set to 0.5° C./sec or faster. The average cooling rate at lower than Ms-120° C. is preferably 1.0° C./sec or faster.

In the final cooling step, the cold-rolled steel sheet may be held in a temperature range of Ms-120° C. to 450° C. for 1000 seconds or shorter. By holding the cold-rolled steel sheet in the temperature range of Ms-120° C. to 450° C. for 1000 seconds or shorter, the amount of solid solution C can be further reduced, and the amount of work hardening in a high strain region can be lowered. When the retention time exceeds 1000 seconds, the average carbide size increases, so that work hardening after yielding may become small, the yield stress may be increased, to the toughness may deteriorate. Therefore, in a case where the steel sheet is held in the temperature range of Ms-120° C. to 450° C., the retention time is set to 1000 seconds or shorter. In the final cooling step, the lower limit of the retention time in the case where the cold-rolled steel sheet is held in the above temperature range is not particularly limited, but is, for example, 10 seconds or longer in order to obtain the above effect more reliably.

The treatment of holding the cold-rolled steel sheet in the temperature range of Ms-120° C. to 450° C. for a time of 1000 seconds or shorter in the final cooling step may be performed until the temperature of the cold-rolled steel sheet reaches room temperature from Ms-120° C. or after the cold-rolled steel sheet is cooled to room temperature.

The martensitic transformation start temperature Ms is obtained by the following expression.

$$Ms(°C.)=550-361\times C-39\times Mn-35\times V-20\times Cr-17\times Ni-10\times Cu-5\times Mo-5\times W+30\times Al$$

Here, in the above expression, C, Mn, V, Cr, Ni, Cu, Mo, W, and Al are the amounts (mass %) of the corresponding elements in the steel piece.

"Hot-Dip Galvanizing Step"

In a case where a galvanized layer is formed on the surface of the steel sheet, a hot-dip galvanizing step of immersing the cold-rolled steel sheet in a molten zinc bath may be provided between the post-annealing cooling step and the final cooling step.

The plating conditions may be set according to a normal method.

[Alloying Step]

In a case where the hot-dip galvanized layer is a hot-dip galvannealed layer, it is preferable that an alloying step of reheating the cold-rolled steel sheet to 470° C. to 550° C. and holding the steel sheet for 60 seconds or shorter is provided between the hot-dip galvanizing step and the final cooling step.

EXAMPLES

Next, examples of the present invention will be described. The conditions in the examples are one example of conditions adopted to confirm the feasibility and effects of the present invention, and the present invention is not limited to this one example of conditions. The present invention can adopt various conditions as long as the object of the present invention is achieved without departing from the gist of the present invention.

Example 1

Molten steels having the chemical compositions shown in Tables 1-1 and 1-2 were continuously cast according to a normal method to obtain cast slabs. In Tables 1-1 and 1-2, the chemical compositions of Kind of steel symbols A to T satisfy the chemical composition of the present invention.

Regarding the chemical compositions of Kinds of steel aa and bb, C does not satisfy the chemical composition of the present invention, and the Si content in the chemical composition of symbol cc, the Mn content in Kinds of steel dd and ee, the P content in Kind of steel ff, the S content in Kind of steel gg, the Al content in Kind of steel hh, and the B content in Kind of steel ii did not satisfy the ranges of the present invention.

TABLE 1-1

| Kind of steel | Chemical composition (mass %) (remainder consists of Fe and impurities) | | | | | | | | | |
|---|---|---|---|---|---|---|---|---|---|---|
| | C | Si | Mn | P | S | N | Al | Nb | Ti | Mo |
| A | 0.28 | 1.16 | 2.40 | 0.020 | 0.0010 | 0.0012 | 0.010 | — | — | — |
| B | 0.31 | 1.18 | 2.20 | 0.020 | 0.0010 | 0.0019 | 0.010 | — | — | — |
| C | 0.34 | 0.68 | 0.80 | 0.010 | 0.0010 | 0.0013 | 0.010 | — | — | — |
| D | 0.37 | 0.26 | 0.50 | 0.020 | 0.0006 | 0.0019 | 0.010 | 0.050 | — | — |
| E | 0.17 | 1.56 | 3.00 | 0.040 | 0.0009 | 0.0010 | 0.010 | — | 0.040 | — |
| F | 0.29 | 1.51 | 0.90 | 0.020 | 0.0005 | 0.0018 | 0.010 | — | — | 0.210 |
| G | 0.26 | 0.47 | 3.40 | 0.010 | 0.0010 | 0.0010 | 0.800 | — | — | — |
| H | 0.21 | 0.68 | 2.00 | 0.040 | 0.0008 | 0.0016 | 0.010 | — | — | — |
| I | 0.20 | 0.74 | 1.10 | 0.030 | 0.0009 | 0.0016 | 0.010 | — | — | — |
| J | 0.31 | 1.48 | 1.90 | 0.020 | 0.0008 | 0.0011 | 0.010 | — | — | — |
| K | 0.34 | 0.12 | 1.00 | 0.010 | 0.0006 | 0.0020 | 1.400 | — | — | — |
| L | 0.31 | 1.16 | 1.20 | 0.010 | 0.0007 | 0.0018 | 0.010 | — | — | — |
| M | 0.22 | 1.40 | 1.60 | 0.020 | 0.0005 | 0.0015 | 0.010 | — | — | — |
| N | 0.30 | 1.29 | 1.80 | 0.030 | 0.0008 | 0.0018 | 0.010 | — | — | — |
| O | 0.23 | 0.24 | 1.00 | 0.030 | 0.0005 | 0.0011 | 0.010 | — | — | — |
| P | 0.27 | 0.71 | 3.30 | 0.030 | 0.0009 | 0.0019 | 0.010 | — | — | — |
| Q | 0.35 | 0.80 | 1.70 | 0.030 | 0.0008 | 0.0018 | 0.010 | — | — | — |
| R | 0.30 | 0.09 | 0.50 | 0.020 | 0.0006 | 0.0015 | 0.010 | — | — | — |
| S | 0.21 | 0.84 | 3.10 | 0.040 | 0.0007 | 0.0011 | 0.010 | — | — | — |
| T | 0.31 | 1.10 | 1.90 | 0.040 | 0.0008 | 0.0011 | 0.010 | — | — | — |
| aa | 0.43 | 0.31 | 1.70 | 0.010 | 0.0010 | 0.0019 | 0.010 | — | — | — |
| bb | 0.12 | 0.90 | 2.80 | 0.040 | 0.0005 | 0.0018 | 0.010 | — | — | — |
| cc | 0.24 | 2.20 | 3.30 | 0.040 | 0.0009 | 0.0010 | 0.010 | — | — | — |
| dd | 0.34 | 0.31 | 4.20 | 0.020 | 0.0008 | 0.0011 | 0.010 | — | — | — |
| ee | 0.35 | 1.23 | 0.08 | 0.020 | 0.0009 | 0.0016 | 0.010 | — | — | — |
| ff | 0.30 | 0.61 | 2.90 | 0.120 | 0.0009 | 0.0016 | 0.010 | — | — | — |
| gg | 0.18 | 1.42 | 3.20 | 0.020 | 0.0120 | 0.0010 | 0.010 | — | — | — |
| hh | 0.35 | 0.80 | 0.60 | 0.010 | 0.0005 | 0.0011 | 1.800 | — | — | — |
| ii | 0.21 | 0.28 | 1.20 | 0.020 | 0.0009 | 0.0016 | 0.010 | — | — | — |

TABLE 1-2

| Kind of steel | Cr | B | Ni | V | W | Cu | Others | Ac3 (° C.) | MS (° C.) | Note |
|---|---|---|---|---|---|---|---|---|---|---|
| A | — | — | — | — | — | — | — | 840 | 356 | Invention Steel |
| B | — | — | — | — | — | — | — | 835 | 353 | Invention Steel |
| C | — | — | — | — | — | — | — | 806 | 396 | Invention Steel |
| D | — | — | — | — | — | — | — | 782 | 397 | Invention Steel |
| E | — | — | — | — | — | — | — | 885 | 372 | Invention Steel |
| F | — | — | — | — | — | — | — | 860 | 409 | Invention Steel |
| G | 1.100 | — | — | — | — | — | — | 814 | 326 | Invention Steel |
| H | — | 0.0015 | — | — | — | — | — | 835 | 396 | Invention Steel |
| I | — | — | — | — | — | — | — | 840 | 435 | Invention Steel |
| J | — | — | — | — | — | — | Mg: 0.0020 | 848 | 364 | Invention Steel |
| K | — | — | 0.30 | — | — | 0.50 | — | 777 | 420 | Invention Steel |
| L | — | — | — | — | — | — | Ca: 0.0020 | 834 | 392 | Invention Steel |
| M | — | — | — | 0.100 | — | — | — | 875 | 405 | Invention Steel |
| N | — | — | — | — | 0.11 | — | — | 843 | 371 | Invention Steel |
| O | — | — | — | — | — | — | Ce: 0.0025 | 810 | 428 | Invention Steel |
| P | — | — | — | — | — | — | Zr: 0.0040 | 822 | 324 | Invention Steel |
| Q | — | — | — | — | — | — | La: 0.0025 | 810 | 358 | Invention Steel |
| R | — | — | — | — | — | — | REM: 0.0027 | 788 | 423 | Invention Steel |
| S | — | — | — | — | — | — | Sn: 0.100 | 842 | 354 | Invention Steel |
| T | — | — | — | — | — | — | Sb: 0.200 | 831 | 364 | Invention Steel |
| aa | — | — | — | — | — | — | — | 773 | 329 | Comparative Steel |
| bb | — | — | — | — | — | — | — | 871 | 398 | Comparative Steel |
| cc | — | — | — | — | — | — | — | 896 | 335 | Comparative Steel |
| dd | — | — | — | — | — | — | — | 790 | 264 | Comparative Steel |
| ee | — | — | — | — | — | — | — | 829 | 421 | Comparative Steel |
| ff | — | — | — | — | — | — | — | 811 | 329 | Comparative Steel |
| gg | — | — | — | — | — | — | — | 876 | 361 | Comparative Steel |
| hh | — | — | — | — | — | — | — | 810 | 454 | Comparative Steel |
| ii | — | 0.0080 | — | — | — | — | — | 817 | 428 | Comparative Steel |

The cast slabs having the chemical compositions shown in Tables 1-1 and 1-2 were heated, subjected to hot rolling, cooled, subjected to a coiling treatment, pickled, and thereafter subjected to cold rolling as shown in Tables 2-1 to 2-10, thereby manufacturing steel sheets having a sheet thickness of 1.2 mm. The steel sheets were annealed and cooled under the conditions shown in Tables 2-1 to 2-10. Depending on the conditions, plating was applied. In the pickling, the hot-rolled steel sheet cooled to room temperature was immersed in 5 to 10 mass % hydrochloric acid as hydrogen chloride whose temperature was controlled to 80° C. to 90° C. for a total of 30 seconds to 100 seconds, whereby scale on the surface was removed.

In Tables 2-1 to 2-10, "Cumulative rolling reduction" of Hot rolling step is a cumulative rolling reduction in a temperature range of 1050° C. or higher. In Tables 2-1 to 2-10, "Cooling start time" of Cooling step is a time from the end of the hot rolling to the start of rapid cooling. In Tables 2-1 to 2-10, "Cooling rate (1)" in Cooling step is a cooling rate in a temperature range from 850° C. to 700° C. In Tables 2-1 to 2-10, "Cooling rate (2)" of Cooling step is a cooling rate in a temperature range from 700° C. to a coiling temperature. In Tables 2-1 to 2-10, "Cooling rate (3)" of Post-annealing cooling step is a cooling rate in a temperature range of 740° C. or lower and higher than 550° C. In Tables 2-1 to 2-10, "Cooling rate (4)" of Post-annealing cooling step is a cooling rate in a temperature range of 550° C. or lower and higher than Ms° C. In Tables 2-1 to 2-10, "Cooling rate (5)" of Post-annealing cooling step is a cooling rate in a temperature range of Ms° C. or lower and higher than Ms-15° C. In Tables 2-1 to 2-10, "Cooling rate (6)" of Post-annealing cooling step is a cooling rate in a temperature range of Ms-15° C. or lower and higher than Ms-40° C. In Tables 2-1 to 2-10, "Cooling rate (7)" of Post-annealing cooling step is a cooling rate in a temperature range of Ms--40° C. to Ms-120° C. In Tables 2-1 to 2-10, "Tensile stress" of Post-annealing cooling step is a tensile stress applied to the cold-rolled steel sheet in a temperature range of Ms° C. or lower and Ms-120° C. In Tables 2-1 to 2-10, "Presence or absence of heat treatment" in Final cooling step is the presence or absence of a heat treatment in a temperature range of Ms-120° C. to 450° C. In Tables 2-1 to 2-10, "Retention time" of Final cooling step is a retention time at a holding temperature. In Tables 2-1 to 2-10, "Cooling rate (8)" in Final cooling step is a cooling rate in a temperature range of lower than Ms-120° C. in a case where the above heat treatment is not performed in the final cooling step, and is a cooling rate in a temperature range of the holding temperature or lower in a case where the above heat treatment is performed. In Tables 2-1 to 2-10, "Retention time" of Alloying step is a retention time at a reheating temperature.

In Tables 2-1 to 2-10, in Kind of plating of Hot-dip galvanizing step, "GI" indicates hot-dip galvanizing, and "GA" indicates hot-dip galvannealing.

TABLE 2-1

| | | Hot rolling step | | Cooling step | | | | Cold rolling step | Annealing step | | | | Post-annealing cooling step | | |
|---|---|---|---|---|---|---|---|---|---|---|---|---|---|---|---|
| Treatment No. | Steel | Heating temperature °C. | Cumulative rolling reduction % | Cooling start time sec | Cooling rate (1) °C./sec | Cooling rate (2) °C./sec | Coiling step Coiling temperature °C. | Cold rolling ratio % | Heating rate in temperature range of 650° C. to 750° C. °C./sec | Highest heating temperature °C. | Ac3 °C. | Retention time sec | Cooling rate (3) °C./sec | Cooling rate (4) °C./sec | Ms °C. |
| 1 | A | 1250 | 42 | 1.0 | 67 | 50 | 550 | 52 | 3.0 | 920 | 840 | 60 | 20 | 50 | 356 |
| 2 | A | 1250 | 45 | 2.3 | 69 | 33 | 550 | 52 | 0.1 | 930 | 840 | 80 | 53 | 50 | 356 |
| 3 | A | 1250 | 40 | 2.3 | 90 | 63 | 520 | 52 | 0.3 | 910 | 840 | 31 | 27 | 60 | 356 |
| 4 | A | 1250 | 41 | 1.2 | 40 | 52 | 550 | 52 | 8.0 | 930 | 840 | 47 | 44 | 57 | 356 |
| 5 | A | 1250 | 44 | 0.7 | 80 | 34 | 510 | 52 | 15.0 | 950 | 840 | 56 | 29 | 53 | 356 |
| 6 | A | 1250 | 43 | 1.2 | 74 | 59 | 520 | 52 | 4.0 | 820 | 840 | 30 | 53 | 44 | 356 |
| 7 | A | 1250 | 40 | 2.6 | 42 | 72 | 550 | 52 | 1.1 | 805 | 840 | 87 | 49 | 42 | 356 |
| 8 | A | 1250 | 44 | 2.4 | 30 | 62 | 430 | 52 | 3.0 | 1015 | 840 | 85 | 36 | 51 | 356 |
| 9 | A | 1250 | 46 | 1.0 | 77 | 51 | 480 | 52 | 2.9 | 1100 | 840 | 88 | 27 | 48 | 356 |
| 10 | A | 1250 | 40 | 2.0 | 73 | 52 | 460 | 52 | 1.5 | 900 | 840 | 0 | 55 | 57 | 356 |
| 11 | A | 1250 | 44 | 1.7 | 43 | 60 | 480 | 52 | 2.5 | 960 | 840 | 1 | 51 | 49 | 356 |
| 12 | A | 1250 | 45 | 1.2 | 38 | 44 | 430 | 52 | 3.4 | 940 | 840 | 180 | 43 | 52 | 356 |
| 13 | A | 1250 | 45 | 2.1 | 69 | 66 | 540 | 52 | 3.0 | 910 | 840 | 1000 | 21 | 48 | 356 |
| 14 | A | 1250 | 46 | 0.5 | 37 | 43 | 520 | 52 | 4.5 | 900 | 840 | 25 | 7 | 49 | 356 |
| 15 | A | 1250 | 42 | 1.1 | 48 | 59 | 550 | 52 | 2.2 | 950 | 840 | 82 | 1 | 59 | 356 |
| 16 | A | 1250 | 47 | 1.3 | 80 | 46 | 540 | 52 | 4.1 | 900 | 840 | 83 | 25 | 20 | 356 |
| 17 | A | 1250 | 43 | 0.6 | 38 | 58 | 490 | 52 | 2.9 | 900 | 840 | 64 | 53 | 10 | 356 |
| 76 | C | 1250 | 46 | 1.8 | 60 | 75 | 550 | 52 | 3.0 | 900 | 806 | 55 | 51 | 40 | 396 |
| 18 | A | 1250 | 46 | 0.5 | 36 | 50 | 450 | 52 | 2.3 | 960 | 840 | 60 | 47 | 50 | 356 |
| 19 | A | 1250 | 40 | 0.9 | 36 | 70 | 440 | 52 | 1.6 | 930 | 840 | 21 | 22 | 58 | 356 |
| 20 | A | 1250 | 42 | 1.0 | 59 | 30 | 550 | 52 | 3.0 | 920 | 840 | 60 | 20 | 50 | 356 |
| 21 | A | 1250 | 42 | 1.0 | 59 | 30 | 550 | 52 | 3.0 | 920 | 840 | 60 | 20 | 50 | 356 |
| 22 | A | 1250 | 42 | 1.0 | 59 | 30 | 550 | 52 | 3.0 | 920 | 840 | 60 | 20 | 50 | 356 |
| 23 | A | 1250 | 42 | 1.0 | 59 | 30 | 550 | 52 | 3.0 | 920 | 840 | 60 | 20 | 50 | 356 |
| 24 | A | 1250 | 42 | 1.0 | 59 | 30 | 550 | 52 | 3.0 | 920 | 840 | 60 | 20 | 50 | 356 |

TABLE 2-2

| | | Post-annealing cooling step | | | Final cooling step | | | | Hot-dip galvanizing step | | Alloying step | | | |
|---|---|---|---|---|---|---|---|---|---|---|---|---|---|---|
| Treatment No. | Steel | Cooling rate (5) °C./sec | Cooling rate (6) °C./sec | Cooling rate (7) °C./sec | Tensile stress MPa | Presence or absence of heat treatment | Holding temperature °C. | Retention time sec | Cooling rate (8) °C./sec | Presence or absence of plating treatment | Kind of plating | Reheating temperature °C. | Retention time sec | Note |
| 1 | A | 7 | 60 | 10 | 20 | Absent | — | — | 2.6 | Absent | — | — | — | Invention Steel |
| 2 | A | 12 | 60 | 7 | 40 | Absent | — | — | 1.5 | Absent | — | — | — | Comparative Steel |
| 3 | A | 11 | 62 | 9 | 81 | Absent | — | — | 3.8 | Absent | — | — | — | Comparative Steel |
| 4 | A | 8 | 67 | 9 | 68 | Absent | — | — | 1.7 | Absent | — | — | — | Comparative Steel |
| 5 | A | 11 | 83 | 12 | 61 | Absent | — | — | 3.1 | Absent | — | — | — | Comparative Steel |
| 6 | A | 14 | 65 | 8 | 60 | Absent | — | — | 4.0 | Absent | — | — | — | Comparative Steel |
| 7 | A | 9 | 74 | 16 | 90 | Absent | — | — | 2.3 | Absent | — | — | — | Comparative Steel |
| 8 | A | 14 | 64 | 16 | 61 | Absent | — | — | 3.2 | Absent | — | — | — | Comparative Steel |
| 9 | A | 14 | 92 | 17 | 51 | Absent | — | — | 3.4 | Absent | — | — | — | Comparative Steel |
| 10 | A | 11 | 82 | 13 | 84 | Absent | — | — | 1.8 | Absent | — | — | — | Comparative Steel |
| 11 | A | 9 | 87 | 12 | 27 | Absent | — | — | 2.0 | Absent | — | — | — | Comparative Steel |
| 12 | A | 11 | 71 | 7 | 50 | Absent | — | — | 4.0 | Absent | — | — | — | Comparative Steel |
| 13 | A | 12 | 91 | 15 | 33 | Absent | — | — | 3.1 | Absent | — | — | — | Comparative Steel |
| 14 | A | 7 | 82 | 7 | 87 | Absent | — | — | 1.3 | Absent | — | — | — | Comparative Steel |
| 15 | A | 12 | 62 | 7 | 33 | Absent | — | — | 1.4 | Absent | — | — | — | Comparative Steel |
| 16 | A | 9 | 100 | 8 | 27 | Absent | — | — | 3.7 | Absent | — | — | — | Comparative Steel |
| 17 | A | 8 | 79 | 10 | 79 | Absent | — | — | 3.5 | Absent | — | — | — | Comparative Steel |
| 76 | C | 1 | 86 | 17 | 86 | Absent | — | — | 1.8 | Absent | — | — | — | Comparative Steel |
| 18 | A | 2 | 59 | 16 | 43 | Absent | — | — | 1.3 | Absent | — | — | — | Comparative Steel |
| 19 | A | 3 | 78 | 15 | 39 | Absent | — | — | 4.0 | Absent | — | — | — | Comparative Steel |
| 20 | A | 6 | 60 | 10 | 45 | Absent | — | — | 2.2 | Absent | — | — | — | Invention Steel |
| 21 | A | 10 | 60 | 10 | 45 | Absent | — | — | 2.2 | Absent | — | — | — | Invention Steel |
| 22 | A | 20 | 60 | 10 | 45 | Absent | — | — | 2.2 | Absent | — | — | — | Invention Steel |
| 23 | A | 30 | 60 | 10 | 45 | Absent | — | — | 2.2 | Absent | — | — | — | Invention Steel |
| 24 | A | 50 | 60 | 10 | 45 | Absent | — | — | 2.2 | Absent | — | — | — | Comparative Steel |

TABLE 2-3

| | | Hot rolling step | | Cooling step | | | Coiling step | Cold rolling step | Annealing step | | | | Post-annealing cooling step | | |
|---|---|---|---|---|---|---|---|---|---|---|---|---|---|---|---|
| Treatment No. | Steel | Heating temperature | Cumulative rolling reduction | Cooling start time | Cooling rate (1) | Cooling rate (2) | Coiling temperature | Cold rolling ratio | Heating rate in temperature range of 650° C. to 750° C. | Highest heating temperature | Ac3 | Retention time | Cooling rate (3) | Cooling rate (4) | Ms |
| 25 | A | 1250 | 42 | 1.0 | 59 | 30 | 550 | 52 | 3.0 | 920 | 840 | 60 | 20 | 50 | 356 |
| 73 | B | 1250 | 45 | 2.5 | 63 | 79 | 520 | 52 | 2.7 | 920 | 835 | 25 | 18 | 44 | 353 |
| 26 | A | 1250 | 42 | 1.0 | 59 | 30 | 550 | 52 | 3.0 | 920 | 840 | 60 | 20 | 50 | 356 |
| 27 | A | 1250 | 42 | 1.0 | 59 | 30 | 550 | 52 | 3.0 | 920 | 840 | 60 | 20 | 50 | 356 |
| 82 | E | 1250 | 45 | 1.2 | 64 | 80 | 480 | 52 | 3.6 | 960 | 885 | 77 | 34 | 45 | 372 |
| 28 | A | 1250 | 42 | 1.0 | 59 | 30 | 550 | 52 | 3.0 | 920 | 840 | 60 | 20 | 50 | 356 |
| 29 | A | 1250 | 42 | 1.0 | 59 | 30 | 550 | 52 | 3.0 | 920 | 840 | 60 | 20 | 50 | 356 |
| 30 | A | 1250 | 42 | 1.0 | 59 | 30 | 550 | 52 | 3.0 | 920 | 840 | 60 | 20 | 50 | 356 |
| 31 | A | 1250 | 42 | 1.0 | 59 | 30 | 550 | 52 | 3.0 | 920 | 840 | 60 | 20 | 50 | 356 |
| 32 | A | 1250 | 42 | 1.0 | 59 | 30 | 550 | 52 | 3.0 | 920 | 840 | 60 | 20 | 50 | 356 |
| 33 | A | 1250 | 42 | 1.0 | 59 | 30 | 550 | 52 | 3.0 | 920 | 840 | 60 | 20 | 50 | 356 |
| 79 | D | 1250 | 45 | 2.0 | 33 | 41 | 520 | 52 | 2.1 | 920 | 782 | 21 | 17 | 44 | 397 |
| 34 | A | 1250 | 42 | 1.0 | 59 | 30 | 550 | 52 | 3.0 | 920 | 840 | 60 | 20 | 50 | 356 |
| 35 | A | 1250 | 42 | 1.0 | 59 | 30 | 550 | 52 | 3.0 | 920 | 840 | 60 | 20 | 50 | 356 |
| 85 | F | 1250 | 43 | 2.1 | 75 | 74 | 440 | 52 | 2.9 | 940 | 860 | 57 | 52 | 53 | 409 |
| 36 | A | 1250 | 42 | 1.0 | 59 | 30 | 550 | 52 | 3.0 | 920 | 840 | 60 | 20 | 50 | 356 |
| 37 | A | 1250 | 42 | 1.0 | 59 | 30 | 550 | 52 | 3.0 | 920 | 840 | 60 | 20 | 50 | 356 |
| 38 | A | 1250 | 42 | 1.0 | 59 | 30 | 550 | 52 | 3.0 | 920 | 840 | 60 | 20 | 50 | 356 |
| 39 | A | 1250 | 42 | 1.0 | 59 | 30 | 550 | 52 | 3.0 | 920 | 840 | 60 | 20 | 50 | 356 |
| 40 | A | 1250 | 42 | 1.0 | 59 | 30 | 550 | 52 | 3.0 | 920 | 840 | 60 | 20 | 50 | 356 |
| 41 | A | 1250 | 42 | 1.0 | 59 | 30 | 550 | 52 | 3.0 | 920 | 840 | 60 | 20 | 50 | 356 |
| 88 | G | 1250 | 47 | 2.6 | 39 | 47 | 540 | 52 | 1.0 | 910 | 814 | 76 | 45 | 41 | 326 |
| 91 | H | 1250 | 46 | 1.4 | 82 | 52 | 420 | 52 | 2.2 | 940 | 835 | 55 | 44 | 45 | 396 |
| 42 | A | 1250 | 48 | 1.4 | 72 | 57 | 540 | 52 | 4.4 | 900 | 840 | 22 | 52 | 40 | 356 |
| 43 | A | 1250 | 48 | 2.2 | 72 | 56 | 450 | 52 | 4.0 | 930 | 840 | 62 | 56 | 50 | 356 |
| 44 | A | 1250 | 41 | 1.0 | 81 | 61 | 430 | 52 | 4.7 | 950 | 840 | 56 | 21 | 51 | 356 |

TABLE 2-4

| | | Post-annealing cooling step | | | | Final cooling step | | | Hot-dip galvanizing step | | Alloying step | | |
|---|---|---|---|---|---|---|---|---|---|---|---|---|---|
| Treatment No. | Steel | Cooling rate (5) | Cooling rate (6) | Cooling rate (7) | Tensile stress | Presence or absence of heat treatment | Holding temperature | Retention time | Cooling rate (8) | Presence or absence of plating treatment | Kind of plating | Reheating temperature | Retention time | Note |
| 25 | A | 60 | 60 | 10 | 45 | Absent | — | — | 2.2 | Absent | — | — | — | Comparative Steel |
| 73 | B | 60 | 59 | 12 | 57 | Absent | — | — | 1.1 | Absent | — | — | — | Comparative Steel |
| 26 | A | 7 | 150 | 10 | 45 | Absent | — | — | 2.2 | Absent | — | — | — | Comparative Steel |
| 27 | A | 7 | 135 | 10 | 45 | Absent | — | — | 2.2 | Absent | — | — | — | Comparative Steel |
| 82 | E | 10 | 200 | 8 | 78 | Absent | — | — | 2.9 | Absent | — | — | — | Comparative Steel |
| 28 | A | 7 | 120 | 10 | 45 | Absent | — | — | 2.2 | Absent | — | — | — | Invention Steel |
| 29 | A | 7 | 60 | 10 | 45 | Absent | — | — | 2.2 | Absent | — | — | — | Invention Steel |
| 30 | A | 7 | 40 | 10 | 45 | Absent | — | — | 2.2 | Absent | — | — | — | Invention Steel |
| 31 | A | 7 | 30 | 10 | 45 | Absent | — | — | 2.2 | Absent | — | — | — | Invention Steel |
| 32 | A | 7 | 20 | 10 | 45 | Absent | — | — | 2.2 | Absent | — | — | — | Comparative Steel |
| 33 | A | 7 | 10 | 10 | 45 | Absent | — | — | 2.2 | Absent | — | — | — | Comparative Steel |
| 79 | D | 13 | 10 | 12 | 60 | Absent | — | — | 1.5 | Absent | — | — | — | Comparative Steel |
| 34 | A | 7 | 90 | 1 | 45 | Absent | — | — | 2.2 | Absent | — | — | — | Comparative Steel |
| 35 | A | 7 | 89 | 3 | 45 | Absent | — | — | 2.2 | Absent | — | — | — | Comparative Steel |
| 85 | F | 14 | 51 | 1 | 91 | Absent | — | — | 1.0 | Absent | — | — | — | Comparative Steel |
| 36 | A | 7 | 60 | 6 | 45 | Absent | — | — | 2.2 | Absent | — | — | — | Invention Steel |
| 37 | A | 7 | 60 | 10 | 45 | Absent | — | — | 2.2 | Absent | — | — | — | Invention Steel |
| 38 | A | 7 | 60 | 20 | 45 | Absent | — | — | 2.2 | Absent | — | — | — | Invention Steel |
| 39 | A | 7 | 60 | 35 | 45 | Absent | — | — | 2.2 | Absent | — | — | — | Invention Steel |
| 40 | A | 7 | 60 | 50 | 45 | Absent | — | — | 2.2 | Absent | — | — | — | Comparative Steel |
| 41 | A | 7 | 60 | 60 | 45 | Absent | — | — | 2.2 | Absent | — | — | — | Comparative Steel |
| 88 | G | 8 | 96 | 80 | 54 | Absent | — | — | 2.9 | Absent | — | — | — | Comparative Steel |
| 91 | H | 13 | 60 | 17 | 0 | Absent | — | — | 3.2 | Absent | — | — | — | Comparative Steel |

TABLE 2-4-continued

| | | Post-annealing cooling step | | | | Final cooling step | | | Hot-dip galvanizing step | | Alloying step | | |
|---|---|---|---|---|---|---|---|---|---|---|---|---|---|
| Treatment No. | Steel | Cooling rate (5) | Cooling rate (6) | Cooling rate (7) | Tensile stress | Presence or absence of heat treatment | Holding temperature | Retention time | Cooling rate (8) | Presence or absence of plating treatment | Kind of plating | Reheating temperature | Retention time | Note |
| 42 | A | 7 | 60 | 11 | 0 | Absent | — | — | 2.0 | Absent | — | — | — | Comparative Steel |
| 43 | A | 7 | 60 | 14 | 10 | Absent | — | — | 3.9 | Absent | — | — | — | Comparative Steel |
| 44 | A | 7 | 60 | 13 | 150 | No data due to fracture | | | | | | | | Comparative Steel |

TABLE 2-5

| | | Hot rolling step | | Cooling step | | | | Cold rolling step | Annealing step | | | | Post-annealing cooling step | | |
|---|---|---|---|---|---|---|---|---|---|---|---|---|---|---|---|
| Treatment No. | Steel | Heating temperature °C | Cumulative rolling reduction % | Cooling start time sec | Cooling rate (1) °C./sec | Cooling rate (2) °C./sec | Coiling step Coiling temperature °C | Cold rolling ratio % | Heating rate in temperature range of 650° C. to 750° C. °C./sec | Highest heating temperature °C. | Ac3 °C. | Retention time sec | Cooling rate (3) °C./sec | Cooling rate (4) °C./sec | Ms °C. |
| 45 | A | 1250 | 45 | 2.1 | 52 | 66 | 540 | 52 | 2.9 | 930 | 840 | 17 | 18 | 51 | 356 |
| 46 | A | 1250 | 42 | 0.7 | 82 | 38 | 490 | 52 | 3.2 | 940 | 840 | 85 | 54 | 47 | 356 |
| 47 | A | 1250 | 48 | 2.2 | 51 | 67 | 500 | 52 | 3.9 | 970 | 840 | 27 | 57 | 46 | 356 |
| 50 | A | 1250 | 43 | 0.9 | 70 | 58 | 570 | 52 | 2.3 | 910 | 840 | 54 | 49 | 58 | 356 |
| 51 | A | 1250 | 43 | 1.3 | 64 | 65 | 480 | 52 | 1.4 | 910 | 840 | 65 | 28 | 44 | 356 |
| 52 | A | 1250 | 42 | 1.6 | 81 | 65 | 570 | 52 | 3.1 | 940 | 840 | 78 | 59 | 50 | 356 |
| 53 | A | 1250 | 48 | 1.0 | 84 | 30 | 460 | 52 | 1.7 | 920 | 840 | 19 | 58 | 52 | 356 |
| 54 | A | 1250 | 41 | 1.4 | 35 | 71 | 550 | 52 | 3.8 | 940 | 840 | 80 | 55 | 48 | 356 |
| 55 | B | 1250 | 46 | 0.7 | 83 | 65 | 560 | 52 | 4.1 | 910 | 835 | 59 | 31 | 50 | 353 |
| 56 | C | 1250 | 43 | 2.2 | 39 | 46 | 450 | 52 | 1.2 | 960 | 806 | 58 | 39 | 40 | 396 |
| 57 | D | 1250 | 46 | 1.4 | 82 | 57 | 500 | 52 | 1.7 | 970 | 782 | 48 | 32 | 41 | 397 |
| 58 | A | 1120 | 44 | 2.1 | 41 | 43 | 450 | 52 | 2.6 | 910 | 840 | 20 | 32 | 60 | 356 |
| 59 | A | 1400 | 44 | 0.6 | 57 | 63 | 470 | 52 | 4.0 | 960 | 840 | 66 | 45 | 52 | 356 |
| 60 | A | 1250 | 20 | 2.7 | 86 | 33 | 460 | 52 | 2.3 | 940 | 840 | 90 | 32 | 51 | 356 |
| 61 | A | 1250 | 28 | 1.1 | 51 | 80 | 570 | 52 | 4.6 | 970 | 840 | 50 | 23 | 58 | 356 |
| 62 | A | 1250 | 41 | 5.0 | 59 | 41 | 520 | 52 | 3.1 | 970 | 840 | 53 | 25 | 51 | 356 |
| 63 | A | 1250 | 41 | 10.0 | 87 | 78 | 530 | 52 | 4.1 | 930 | 840 | 17 | 25 | 60 | 356 |
| 64 | A | 1250 | 48 | 0.8 | 5 | 55 | 420 | 52 | 2.4 | 960 | 840 | 90 | 33 | 55 | 356 |
| 65 | A | 1250 | 43 | 1.1 | 15 | 62 | 500 | 52 | 3.8 | 920 | 840 | 67 | 56 | 41 | 356 |
| 66 | A | 1250 | 47 | 0.9 | 53 | 10 | 570 | 52 | 2.2 | 970 | 840 | 52 | 33 | 47 | 356 |
| 67 | A | 1250 | 47 | 0.5 | 52 | 17 | 470 | 52 | 2.5 | 910 | 840 | 79 | 57 | 45 | 356 |
| 68 | A | 1250 | 46 | 1.0 | 40 | 75 | 750 | 52 | 1.6 | 910 | 840 | 38 | 54 | 41 | 356 |
| 69 | A | 1250 | 48 | 1.7 | 61 | 59 | 700 | 52 | 3.2 | 910 | 840 | 16 | 52 | 54 | 356 |
| 94 | I | 1250 | 40 | 2.6 | 30 | 41 | 700 | 52 | 3.9 | 950 | 840 | 89 | 37 | 50 | 435 |
| 70 | A | 1250 | 47 | 1.2 | 55 | 31 | 640 | 52 | 2.8 | 900 | 840 | 48 | 31 | 40 | 356 |

TABLE 2-6

| | | Post-annealing cooling step | | | | Final cooling step | | | |
|---|---|---|---|---|---|---|---|---|---|
| Treatment No. | Steel | Cooling rate (5) °C./sec | Cooling rate (6) °C./sec | Cooling rate (7) °C./sec | Tensile stress MPa | Presence or absence of heat treatment | Holding temperature °C. | Retention time sec | Cooling rate (8) °C./sec |
| 45 | A | 13 | 65 | 12 | 44 | Present | 250 | 341 | 1.6 |
| 46 | A | 11 | 92 | 14 | 64 | Present | 300 | 130 | 2.4 |
| 47 | A | 12 | 61 | 15 | 78 | Present | 350 | 427 | 2.3 |
| 50 | A | 14 | 60 | 11 | 37 | Absent | — | — | 0.1 |
| 51 | A | 13 | 67 | 14 | 28 | Absent | — | — | 0.2 |
| 52 | A | 13 | 73 | 13 | 92 | Absent | — | — | 20.0 |
| 53 | A | 10 | 76 | 10 | 50 | Absent | — | — | 100.0 |
| 54 | A | 13 | 71 | 17 | 41 | Absent | — | — | 0.9 |
| 55 | B | 15 | 60 | 7 | 83 | Absent | — | — | 2.6 |
| 56 | C | 10 | 56 | 8 | 49 | Absent | — | — | 3.5 |

TABLE 2-6-continued

| | | | | | | | | | |
|---|---|---|---|---|---|---|---|---|---|
| 57 | D | 13 | 54 | 18 | 69 | Absent | — | — | 2.1 |
| 58 | A | 15 | 77 | 10 | 70 | Absent | — | — | 2.2 |
| 59 | A | 14 | 51 | 17 | 80 | Absent | — | — | 2.2 |
| 60 | A | 12 | 51 | 13 | 79 | Absent | — | — | 3.9 |
| 61 | A | 12 | 66 | 9 | 66 | Absent | — | — | 2.9 |
| 62 | A | 13 | 62 | 15 | 33 | Absent | — | — | 4.0 |
| 63 | A | 14 | 79 | 16 | 95 | Absent | — | — | 2.5 |
| 64 | A | 12 | 79 | 14 | 52 | Absent | — | — | 3.4 |
| 65 | A | 12 | 99 | 14 | 40 | Absent | — | — | 3.2 |
| 66 | A | 14 | 64 | 18 | 57 | Absent | — | — | 2.9 |
| 67 | A | 14 | 89 | 16 | 70 | Absent | — | — | 2.6 |
| 68 | A | 7 | 67 | 16 | 35 | Absent | — | — | 1.4 |
| 69 | A | 7 | 83 | 10 | 43 | Absent | — | — | 3.9 |
| 94 | I | 7 | 75 | 18 | 72 | Absent | — | — | 2.1 |
| 70 | A | 15 | 68 | 10 | 43 | Absent | — | — | 3.5 |

| Treatment No. | Hot-dip galvanizing step Presence or absence of plating treatment | Kind of plating | Alloying step Reheating temperature °C. | Retention time sec | Note |
|---|---|---|---|---|---|
| 45 | Absent | — | — | — | Invention Steel |
| 46 | Absent | — | — | — | Invention Steel |
| 47 | Absent | — | — | — | Invention Steel |
| 50 | Absent | — | — | — | Comparative Steel |
| 51 | Absent | — | — | — | Comparative Steel |
| 52 | Absent | — | — | — | Comparative Steel |
| 53 | Absent | — | — | — | Comparativ Steel |
| 54 | Present | GI | — | — | Invention Steel |
| 55 | Present | GI | — | — | Invention Steel |
| 56 | Present | GA | 490 | 12 | Invention Steel |
| 57 | Present | GA | 520 | 35 | Invention Steel |
| 58 | Absent | — | — | — | Comparative Steel |
| 59 | Absent | — | — | — | Comparative Steel |
| 60 | Absent | — | — | — | Comparative Steel |
| 61 | Absent | — | — | — | Comparative Steel |
| 62 | Absent | — | — | — | Comparative Steel |
| 63 | Absent | — | — | — | Comparative Steel |
| 64 | Absent | — | — | — | Comparative Steel |
| 65 | Absent | — | — | — | Comparative Steel |
| 66 | Absent | — | — | — | Comparative Steel |
| 67 | Absent | — | — | — | Comparative Steel |
| 68 | Absent | — | — | — | Comparative Steel |
| 69 | Absent | — | — | — | Comparative Steel |
| 94 | Absent | — | — | — | Comparative Steel |
| 70 | Absent | — | — | — | Invention Steel |

TABLE 2-7

| Treatment No. | Steel | hot rolling step Heating Temperature °C. | Cumulative rolling reduction % | Cooling step Cooling start time sec | Cooling rate (1) °C./sec | Cooling rate (2) °C./sec | Coiling step Coiling Temperature °C. | Cold rolling step Cold rolling ratio % | Annealing step Heating rate in temperature range of 650° C. to 750° C. °C./sec | Highest heating temperature °C. | Ac3 °C. | Retention time sec | Post-annealing cooling step Cooling rate (3) °C./sec | Cooling rate (4) °C./sec | Ms °C. |
|---|---|---|---|---|---|---|---|---|---|---|---|---|---|---|---|
| 71 | B | 1250 | 48 | 2.2 | 64 | 58 | 570 | 52 | 3.4 | 930 | 835 | 62 | 33 | 43 | 353 |
| 72 | B | 1250 | 41 | 1.2 | 87 | 41 | 470 | 52 | 1.2 | 940 | 835 | 65 | 48 | 58 | 353 |
| 74 | C | 1250 | 41 | 2.4 | 57 | 55 | 460 | 52 | 3.8 | 900 | 806 | 64 | 57 | 54 | 396 |
| 75 | C | 1250 | 45 | 1.2 | 40 | 77 | 450 | 52 | 2.4 | 950 | 806 | 34 | 44 | 58 | 396 |
| 77 | D | 1250 | 48 | 2.2 | 60 | 50 | 440 | 52 | 3.0 | 900 | 782 | 58 | 24 | 54 | 397 |
| 78 | D | 1250 | 46 | 2.4 | 78 | 42 | 430 | 52 | 3.2 | 960 | 782 | 21 | 34 | 50 | 397 |
| 80 | E | 1250 | 48 | 1.8 | 57 | 30 | 570 | 52 | 1.0 | 960 | 885 | 84 | 32 | 47 | 372 |
| 81 | E | 1250 | 42 | 0.8 | 34 | 45 | 450 | 52 | 3.7 | 900 | 885 | 75 | 57 | 48 | 372 |
| 83 | F | 1250 | 42 | 1.0 | 35 | 32 | 510 | 52 | 4.4 | 910 | 860 | 54 | 29 | 46 | 409 |
| 84 | F | 1250 | 45 | 1.7 | 33 | 72 | 470 | 52 | 3.3 | 900 | 860 | 54 | 25 | 51 | 409 |

TABLE 2-7-continued

| | | hot rolling step | | Cooling step | | | | Cold rolling step | Annealing step | | | | Post-annealing cooling step | | |
|---|---|---|---|---|---|---|---|---|---|---|---|---|---|---|---|
| Treatment No. | Steel | Heating Temperature °C. | Cumulative rolling reduction % | Cooling start time sec | Cooling rate (1) °C./sec | Cooling rate (2) °C./sec | Coiling step Coiling Temperature °C. | Cold rolling ratio % | Heating rate in temperature range of 650° C. to 750° C. °C./sec | Highest heating temperature °C. | Ac3 °C. | Retention time sec | Cooling rate (3) °C./sec | Cooling rate (4) °C./sec | Ms °C. |
| 86 | G | 1250 | 41 | 2.0 | 80 | 75 | 550 | 52 | 2.5 | 930 | 814 | 69 | 24 | 53 | 326 |
| 87 | G | 1250 | 45 | 1.1 | 87 | 63 | 450 | 52 | 2.7 | 930 | 814 | 73 | 30 | 56 | 326 |
| 89 | H | 1250 | 41 | 2.5 | 39 | 58 | 550 | 52 | 3.8 | 910 | 835 | 50 | 49 | 50 | 396 |
| 90 | H | 1250 | 40 | 1.6 | 78 | 58 | 460 | 52 | 1.1 | 930 | 835 | 49 | 27 | 60 | 396 |
| 92 | I | 1250 | 40 | 1.6 | 81 | 37 | 420 | 52 | 4.1 | 960 | 840 | 37 | 55 | 49 | 435 |
| 93 | I | 1250 | 43 | 0.8 | 55 | 65 | 480 | 52 | 4.3 | 950 | 840 | 35 | 46 | 55 | 435 |
| 95 | J | 1250 | 47 | 1.8 | 74 | 73 | 570 | 52 | 1.7 | 940 | 848 | 69 | 31 | 40 | 364 |
| 96 | K | 1250 | 43 | 1.9 | 61 | 73 | 570 | 52 | 1.3 | 940 | 777 | 63 | 18 | 54 | 420 |
| 97 | L | 1250 | 40 | 1.9 | 48 | 57 | 460 | 52 | 3.4 | 900 | 834 | 36 | 25 | 58 | 392 |
| 98 | M | 1250 | 47 | 0.6 | 66 | 40 | 530 | 52 | 0.9 | 950 | 875 | 37 | 43 | 56 | 405 |
| 99 | N | 1250 | 48 | 1.6 | 82 | 70 | 540 | 52 | 4.2 | 900 | 843 | 44 | 56 | 44 | 371 |
| 100 | O | 1250 | 40 | 2.6 | 90 | 58 | 470 | 52 | 2.0 | 910 | 810 | 87 | 31 | 53 | 428 |
| 101 | P | 1250 | 44 | 0.5 | 31 | 77 | 510 | 52 | 2.8 | 900 | 822 | 86 | 58 | 55 | 324 |
| 102 | Q | 1250 | 46 | 2.1 | 42 | 61 | 430 | 52 | 1.9 | 970 | 810 | 85 | 53 | 51 | 358 |
| 103 | Q | 1250 | 42 | 1.0 | 73 | 37 | 460 | 52 | 4.7 | 960 | 810 | 41 | 39 | 57 | 358 |

TABLE 2-8

| | | Post-annealing cooling step | | | | Final cooling step | | | |
|---|---|---|---|---|---|---|---|---|---|
| Treatment No. | Steel | Cooling rate (5) °C./sec | Cooling rate (6) °C./sec | Cooling rate (7) °C./sec | Tensile stress MPa | Presence or absence of heat treatment | Holding temperature °C. | Retention time sec | Cooling rate (8) °C./sec |
| 71 | B | 8 | 54 | 17 | 79 | Absent | — | — | 2.8 |
| 72 | B | 12 | 65 | 16 | 37 | Absent | — | — | 3.0 |
| 74 | C | 13 | 74 | 9 | 31 | Absent | — | — | 3.1 |
| 75 | C | 8 | 93 | 7 | 74 | Absent | — | — | 2.2 |
| 77 | D | 14 | 99 | 13 | 56 | Absent | — | — | 2.9 |
| 78 | D | 10 | 75 | 12 | 82 | Absent | — | — | 2.3 |
| 80 | E | 9 | 74 | 13 | 82 | Absent | — | — | 2.0 |
| 81 | E | 12 | 99 | 9 | 50 | Absent | — | — | 3.5 |
| 83 | F | 14 | 68 | 14 | 35 | Absent | — | — | 1.2 |
| 84 | F | 11 | 86 | 14 | 51 | Absent | — | — | 2.3 |
| 86 | G | 15 | 51 | 12 | 79 | Absent | — | — | 3.2 |
| 87 | G | 12 | 71 | 8 | 55 | Absent | — | — | 3.2 |
| 89 | H | 8 | 68 | 14 | 79 | Absent | — | — | 2.2 |
| 90 | H | 12 | 81 | 17 | 94 | Absent | — | — | 3.8 |
| 92 | I | 13 | 96 | 17 | 89 | Absent | — | — | 2.0 |
| 93 | I | 12 | 57 | 14 | 73 | Absent | — | — | 1.7 |
| 95 | J | 15 | 68 | 8 | 40 | Absent | — | — | 1.7 |
| 96 | K | 9 | 63 | 14 | 90 | Absent | — | — | 1.8 |
| 97 | L | 12 | 80 | 16 | 34 | Absent | — | — | 1.7 |
| 98 | M | 12 | 82 | 10 | 50 | Absent | — | — | 3.5 |
| 99 | N | 9 | 89 | 12 | 71 | Absent | — | — | 2.9 |
| 100 | O | 14 | 59 | 15 | 35 | Absent | — | — | 4.0 |
| 101 | P | 11 | 57 | 16 | 75 | Absent | — | — | 1.2 |
| 102 | Q | 9 | 55 | 12 | 87 | Absent | — | — | 2.5 |
| 103 | Q | 10 | 97 | 10 | 61 | Absent | — | — | 1.8 |

| | Hot-dip galvanizing step | | Alloying step | | |
|---|---|---|---|---|---|
| Treatment No. | Presence or absence of plating treatment | Kind of plating | Retention temperature °C. | Reheating time sec | Note |
| 71 | Absent | — | — | — | Invention Steel |
| 72 | Absent | — | — | — | Invention Steel |
| 74 | Absent | — | — | — | Invention Steel |
| 75 | Absent | — | — | — | Invention Steel |

TABLE 2-8-continued

| | | | | | | |
|---|---|---|---|---|---|---|
| 77 | Absent | — | — | — | Invention Steel |
| 78 | Absent | — | — | — | Invention Steel |
| 80 | Absent | — | — | — | Invention Steel |
| 81 | Absent | — | — | — | Invention Steel |
| 83 | Absent | — | — | — | Invention Steel |
| 84 | Absent | — | — | — | Invention Steel |
| 86 | Absent | — | — | — | Invention Steel |
| 87 | Absent | — | — | — | Invention Steel |
| 89 | Absent | — | — | — | Invention Steel |
| 90 | Absent | — | — | — | Invention Steel |
| 92 | Absent | — | — | — | Invention Steel |
| 93 | Absent | — | — | — | Invention Steel |
| 95 | Absent | — | — | — | Invention Steel |
| 96 | Absent | — | — | — | Invention Steel |
| 97 | Absent | — | — | — | Invention Steel |
| 98 | Absent | — | — | — | Invention Steel |
| 99 | Absent | — | — | — | Invention Steel |
| 100 | Absent | — | — | — | Invention Steel |
| 101 | Absent | — | — | — | Invention Steel |
| 102 | Absent | — | — | — | Invention Steel |
| 103 | Absent | — | — | — | Invention Steel |

TABLE 2-9

| | | hot rolling step | | Cooling step | | | Cold rolling step | Annealing step | | | | Post-annealing cooling step | | |
|---|---|---|---|---|---|---|---|---|---|---|---|---|---|---|
| Treatment No. | Steel | Heating Temperature °C. | Cumulative rolling reduction % | Cooling start time sec | Cooling rate (1) °C./sec | Cooling rate (2) °C./sec | Coiling step Coiling Temperature °C. | Cold rolling ratio % | Heating rate in temperature range of 650° C. to 750° C. °C./sec | Highest heating temperature °C. | Ac3 °C. | Retention time sec | Cooling rate (3) °C./sec | Cooling rate (4) °C./sec | Ms °C. |
| 104 | R | 1250 | 43 | 1.5 | 86 | 74 | 480 | 52 | 3.5 | 920 | 788 | 44 | 35 | 41 | 423 |
| 105 | R | 1250 | 43 | 1.9 | 90 | 40 | 520 | 52 | 0.8 | 940 | 788 | 33 | 56 | 44 | 423 |
| 106 | S | 1250 | 48 | 2.3 | 52 | 69 | 430 | 52 | 3.7 | 960 | 842 | 37 | 40 | 44 | 354 |
| 107 | S | 1250 | 46 | 1.1 | 47 | 64 | 440 | 52 | 1.6 | 960 | 842 | 87 | 37 | 53 | 354 |
| 108 | T | 1250 | 43 | 0.8 | 72 | 77 | 450 | 52 | 4.1 | 920 | 831 | 22 | 42 | 50 | 364 |
| 109 | T | 1250 | 43 | 0.9 | 51 | 59 | 50 | 52 | 1.2 | 910 | 831 | 43 | 60 | 57 | 364 |
| 119 | E | 1250 | 48 | 1.8 | 57 | 30 | 570 | 52 | 1.0 | 960 | 885 | 84 | 12 | 35 | 372 |
| 110 | aa | 1250 | 40 | 0.6 | 86 | 52 | 480 | 52 | 4.5 | 970 | 773 | 16 | 34 | 45 | 329 |
| 111 | bb | 1250 | 42 | 1.4 | 73 | 60 | 460 | 52 | 2.6 | 930 | 871 | 62 | 51 | 48 | 398 |
| 112 | cc | 1250 | 47 | 1.7 | 45 | 42 | 460 | 52 | 3.0 | 970 | 896 | 58 | 51 | 40 | 335 |
| 113 | dd | 1250 | 47 | 2.2 | 54 | 52 | 550 | Fractured during cold rolling | | | | | | | |
| 114 | ee | 1250 | 44 | 1.2 | 41 | 54 | 470 | 52 | 4.6 | 960 | 829 | 43 | 43 | 52 | 421 |
| 115 | ff | 1250 | 41 | 0.6 | 49 | 53 | 520 | 52 | 3.2 | 910 | 811 | 74 | 22 | 53 | 329 |
| 116 | gg | 1250 | 46 | 2.5 | 89 | 64 | 530 | 52 | 4.4 | 930 | 876 | 25 | 18 | 42 | 361 |
| 117 | hh | 1250 | 43 | 2.6 | 85 | 39 | 550 | 52 | 1.2 | 970 | 810 | 47 | 40 | 59 | 454 |
| 118 | ii | 1250 | 41 | 2.4 | 85 | 80 | 570 | 52 | 3.8 | 970 | 817 | 57 | 19 | 51 | 428 |

TABLE 2-10

| | | Post-annealing cooling step | | | | Final cooling step | | | |
|---|---|---|---|---|---|---|---|---|---|
| Treatment No. | Steel | Cooling rate (5) °C./sec | Cooling rate (6) °C./sec | Cooling rate (7) °C./sec | Tensile stress MPa | Presence or absence of heat treatment | Holding temperature °C. | Retention time sec | Cooling rate (8) °C./sec |
| 104 | R | 11 | 98 | 18 | 81 | Absent | — | — | 1.8 |
| 105 | R | 12 | 63 | 13 | 52 | Absent | — | — | 1.0 |
| 106 | S | 15 | 97 | 18 | 54 | Absent | — | — | 3.0 |
| 107 | S | 9 | 91 | 14 | 67 | Absent | — | — | 0.8 |
| 108 | T | 13 | 96 | 12 | 45 | Absent | — | — | 2.1 |
| 109 | T | 11 | 72 | 17 | 43 | Absent | — | — | 2.0 |
| 119 | E | 6 | 50 | 7 | 82 | Absent | 390 | 100 | 2.0 |

TABLE 2-10-continued

| 110 | aa | 7 | 85 | 8 | 71 | Absent | — | — | 3.6 |
| 111 | bb | 13 | 91 | 14 | 62 | Absent | — | — | 2.6 |
| 112 | cc | 13 | 70 | 18 | 40 | Absent | — | — | 1.3 |
| 113 | dd | | | | Fractured during cold rolling | | | | |
| 114 | ee | 7 | 99 | 17 | 30 | Absent | — | — | 1.6 |
| 115 | ff | 12 | 69 | 15 | 25 | Absent | — | — | 1.5 |
| 116 | gg | 8 | 88 | 16 | 74 | Absent | — | — | 3.7 |
| 117 | hh | 10 | 55 | 9 | 56 | Absent | — | — | 1.4 |
| 118 | jj | 9 | 88 | 8 | 54 | Absent | — | — | 2.6 |

| | Hot-dip galvanizing step | | Alloying step | | |
| | Presence or | | | | |
| Treatment No. | absence of plating treatment | Kind of plating | Retention temperature °C. | Reheating time sec | Note |
| --- | --- | --- | --- | --- | --- |
| 104 | Absent | — | — | — | Invention Steel |
| 105 | Absent | — | — | — | Invention Steel |
| 106 | Absent | — | — | — | Invention Steel |
| 107 | Absent | — | — | — | Invention Steel |
| 108 | Absent | — | — | — | Invention Steel |
| 109 | Absent | — | — | — | Invention Steel |
| 119 | Absent | — | — | — | Invention Steel |
| 110 | Absent | — | — | — | Comparative Steel |
| 111 | Absent | — | — | — | Comparative Steel |
| 112 | Absent | — | — | — | Comparative Steel |
| 113 | | Fractured during cold rolling | | | Comparative Steel |
| 114 | Absent | — | — | — | Comparative Steel |
| 115 | Absent | — | — | — | Comparative Steel |
| 116 | Absent | — | — | — | Comparative Steel |
| 117 | Absent | — | — | — | Comparative Steel |
| 118 | Absent | — | — | — | Comparative Steel |

The microstructures and mechanical properties of the steel sheets obtained by subjecting the cast slabs to the treatment under the conditions shown in Tables 2-1 to 2-10 were measured and evaluated.

In the microstructure, the fraction of each structure, the average grain size of prior austenite grains, the maximum diameter of prior austenite grains, the amount of solid solution C in martensite, carbide size, and the amount of P at the grain boundaries of prior austenite grains were obtained by the above-described methods.

In a case where ferrite is present, the ferrite is present at the place that was a grain boundary of austenite matrix. Therefore, the boundary between ferrite and martensite is defined as a prior austenite grain boundary.

The test was conducted according to JIS Z 2241 (2011), and the mechanical properties (yield stress YP, tensile strength TS, and elongation) were evaluated. Regarding the toughness, a test was conducted according to JIS Z 2242 (2018). Here, the shape of a notch was a U notch. A test from liquid nitrogen temperature (−196° C.) to 200° C. was conducted to obtain a brittle-ductile transition temperature. As a temperature, a temperature which is an energy intermediate between the energy of ductile fracture and the energy of brittle fracture was obtained by interpolation.

In addition, for evaluating shape fixability, the amount of work hardening immediately after yielding and the amount of work hardening in a high strain region were obtained in the following manner.

The amount of work hardening immediately after yielding was indicated as $d\sigma/d\varepsilon$ at YP+100 MPa, where $\sigma$ was the true stress and $\varepsilon$ was the true strain in the tensile test. $d\sigma/d\varepsilon$ is the derivative of $\sigma$ by $\varepsilon$.

The amount of work hardening in a high strain region was defined as $d\sigma/d\varepsilon$ at TS×0.9.

Tables 3-1 to 3-10 show the measurement results and evaluation results.

TABLE 3-1

| Treatment No. | Ferrite fraction % | Retained austenite fraction % | Martensite fraction % | Plate martensite fraction % | Upper bainite fraction % | Pearlite fraction % | Average grain size of prior austenite μm | Maximum diameter of prior austenite μm | Solid solution C mass % | Average carbide size in martensite μm |
| --- | --- | --- | --- | --- | --- | --- | --- | --- | --- | --- |
| 1 | 0 | 2 | 93 | 16 | 5 | 0 | 7.1 | 14.5 | 0.10 | 0.12 |
| 2 | 0 | 2 | 98 | 6 | 0 | 0 | 13.5 | 17.0 | 0.09 | 0.15 |
| 3 | 0 | 2 | 98 | 5 | 0 | 0 | 12.0 | 16.0 | 0.09 | 0.08 |
| 4 | 0 | 2 | 95 | 16 | 3 | 0 | 6.5 | 25.0 | 0.12 | 0.14 |
| 5 | 0 | 2 | 98 | 18 | 0 | 0 | 5.1 | 28.0 | 0.13 | 0.15 |
| 6 | 15 | 2 | 83 | 19 | 0 | 0 | 5.0 | 18.0 | 0.13 | 0.12 |
| 7 | 30 | 2 | 67 | 18 | 1 | 0 | 6.6 | 14.0 | 0.13 | 0.13 |
| 8 | 0 | 2 | 98 | 7 | 0 | 0 | 18.2 | 24.2 | 0.09 | 0.14 |
| 9 | 0 | 2 | 98 | 5 | 0 | 0 | 22.1 | 38.1 | 0.11 | 0.10 |
| 10 | 13 | 2 | 85 | 16 | 0 | 0 | 5.6 | 15.0 | 0.12 | 0.12 |
| 11 | 15 | 2 | 82 | 17 | 1 | 0 | 7.8 | 18.0 | 0.11 | 0.10 |
| 12 | 0 | 2 | 98 | 7 | 0 | 0 | 15.1 | 20.3 | 0.11 | 0.08 |

TABLE 3-1-continued

| Treatment No. | Ferrite fraction % | Retained austenite fraction % | Martensite fraction % | Plate martensite fraction % | Upper bainite fraction % | Pearlite fraction % | Average grain size of prior austenite μm | Maximum diameter of prior austenite μm | Solid solution C mass % | Average carbide size in martensite μm |
|---|---|---|---|---|---|---|---|---|---|---|
| 13 | 0 | 2 | 98 | 5 | 0 | 0 | 22.1 | 32.1 | 0.12 | 0.14 |
| 14 | 14 | 2 | 76 | 16 | 4 | 4 | 6.3 | 13.0 | 0.12 | 0.12 |
| 15 | 28 | 2 | 64 | 17 | 0 | 6 | 5.5 | 15.0 | 0.10 | 0.08 |
| 16 | 0 | 2 | 83 | 5 | 15 | 0 | 5.9 | 15.0 | 0.11 | 0.18 |
| 17 | 0 | 2 | 68 | 0 | 30 | 0 | 5.7 | 14.0 | 0.11 | 0.18 |
| 76 | 0 | 1 | 68 | 0 | 31 | 0 | 7.0 | 15.0 | 0.11 | 0.10 |
| 18 | 0 | 2 | 63 | 0 | 35 | 0 | 6.4 | 15.5 | 0.12 | 0.13 |
| 19 | 0 | 2 | 84 | 5 | 14 | 0 | 6.4 | 15.7 | 0.12 | 0.13 |
| 20 | 0 | 2 | 91 | 19 | 7 | 0 | 6.3 | 15.3 | 0.11 | 0.11 |
| 21 | 0 | 2 | 94 | 17 | 4 | 0 | 6.3 | 15.1 | 0.12 | 0.11 |
| 22 | 0 | 2 | 98 | 15 | 0 | 0 | 6.3 | 16.0 | 0.11 | 0.11 |
| 23 | 0 | 2 | 98 | 12 | 0 | 0 | 6.3 | 15.9 | 0.11 | 0.12 |
| 24 | 0 | 2 | 98 | 0 | 0 | 0 | 6.5 | 15.6 | 0.11 | 0.12 |

TABLE 3-2

| Treatment No. | Crystal orientation difference ° | P concentration at prior austenite grain boundaries at % | Plating | Yield stress MPa | Tensile strength MPa | Yield ratio % | Elongation % | dσ/dε (VP + 100 MPa) MPa | dσ/dε (0.9TS) MPa | Brittle-ductile transition temperature ° C. | Note |
|---|---|---|---|---|---|---|---|---|---|---|---|
| 1 | 3.7 | 2.6 | Absent | 759 | 1489 | 0.51 | 5.2 | 152030 | 25040 | −50 | Invention Steel |
| 2 | 3.3 | 2.5 | Absent | 1057 | 1489 | 0.71 | 5.4 | 68600 | 34760 | 27 | Comparative Steel |
| 3 | 3.7 | 3.0 | Absent | 1072 | 1489 | 0.72 | 4.7 | 84480 | 22210 | 19 | Comparative Steel |
| 4 | 3.9 | 2.7 | Absent | 789 | 1489 | 0.53 | 5.5 | 155550 | 27680 | 22 | Comparative Steel |
| 5 | 3.5 | 2.5 | Absent | 745 | 1489 | 0.50 | 5.4 | 161660 | 22660 | 29 | Comparative Steel |
| 6 | 4.2 | 2.8 | Absent | 552 | 1150 | 0.48 | 6.2 | 72320 | 23470 | 28 | Comparative Steel |
| 7 | 3.7 | 3.0 | Absent | 405 | 942 | 0.43 | 7.8 | 68730 | 30040 | 6 | Comparative Steel |
| 8 | 4.5 | 2.7 | Absent | 1058 | 1489.6 | 0.71 | 4.6 | 69830 | 26820 | 63 | Comparative Steel |
| 9 | 3.9 | 2.5 | Absent | 1073 | 1489.6 | 0.72 | 5.4 | 64300 | 34880 | 100 | Comparative Steel |
| 10 | 3.5 | 2.9 | Absent | 550 | 1170 | 0.47 | 6.9 | 78440 | 25290 | 14 | Comparative Steel |
| 11 | 4.4 | 2.8 | Absent | 466 | 1110 | 0.42 | 6.6 | 78440 | 33280 | 7 | Comparative Steel |
| 12 | 3.8 | 3.0 | Absent | 1117 | 1489 | 0.75 | 5.5 | 72301 | 22670 | 19 | Comparative Steel |
| 13 | 3.0 | 2.6 | Absent | 1057 | 1489 | 0.71 | 5.4 | 71555 | 31310 | 26 | Comparative Steel |
| 14 | 3.7 | 2.5 | Absent | 581 | 1162 | 0.50 | 6.1 | 72320 | 25120 | 60 | Comparative Steel |
| 15 | 3.6 | 2.7 | Absent | 423 | 962 | 0.44 | 8.2 | 68730 | 22040 | 90 | Comparative Steel |
| 16 | 3.0 | 2.5 | Absent | 781 | 1100 | 0.71 | 6.8 | 69830 | 24190 | −18 | Comparative Steel |
| 17 | 4.3 | 2.9 | Absent | 680 | 945 | 0.72 | 7.5 | 64300 | 33080 | −22 | Comparative Steel |
| 76 | 3.7 | 2.8 | Absent | 747 | 970 | 0.77 | 7.9 | 72070 | 24860 | −10 | Comparative Steel |
| 18 | 3.3 | 2.6 | Absent | 706 | 967 | 0.73 | 8.0 | 66370 | 33780 | −25 | Comparative Steel |
| 19 | 3.0 | 2.7 | Absent | 828 | 1150 | 0.72 | 6.1 | 70100 | 32789 | −20 | Comparative Steel |
| 20 | 3.3 | 2.7 | Absent | 704 | 1380 | 0.51 | 5.2 | 152030 | 31090 | −50 | Invention Steel |
| 21 | 3.0 | 2.7 | Absent | 713 | 1398 | 0.51 | 5.8 | 148600 | 28790 | −55 | Invention Steel |
| 22 | 3.1 | 2.5 | Absent | 832 | 1486 | 0.56 | 5.1 | 132370 | 26530 | −50 | Invention Steel |
| 23 | 3.3 | 2.7 | Absent | 1018 | 1520 | 0.67 | 4.5 | 102320 | 26890 | −15 | Invention Steel |
| 24 | 3.4 | 2.5 | Absent | 1120 | 1555 | 0.72 | 4.7 | 73420 | 24570 | 10 | Comparative Steel |

TABLE 3-3

| Treatment No. | Ferrite fraction % | Retained austenite fraction % | Martensite fraction % | Plate martensite fraction % | Upper bainite fraction % | Pearlite fraction % | Average grain size of prior austenite μm | Maximum diameter of prior austenite μm | Solid solution C mass % | Average carbide size in martensite μm |
|---|---|---|---|---|---|---|---|---|---|---|
| 25 | 0 | 2 | 98 | 0 | 0 | 0 | 6.5 | 15.9 | 0.11 | 0.12 |
| 73 | 1 | 2 | 97 | 0 | 0 | 0 | 5.1 | 15.0 | 0.09 | 0.09 |
| 26 | 0 | 2 | 98 | 16 | 0 | 0 | 6.6 | 15.7 | 0.12 | 0.11 |
| 27 | 0 | 2 | 98 | 17 | 0 | 0 | 6.6 | 15.7 | 0.11 | 0.11 |
| 82 | 1 | 2 | 97 | 25 | 0 | 0 | 5.0 | 15.0 | 0.14 | 0.10 |
| 28 | 0 | 2 | 98 | 17 | 0 | 0 | 6.6 | 15.6 | 0.11 | 0.13 |
| 29 | 0 | 2 | 98 | 18 | 0 | 0 | 6.5 | 15.3 | 0.11 | 0.12 |
| 30 | 0 | 2 | 92 | 16 | 6 | 0 | 6.5 | 15.0 | 0.12 | 0.13 |
| 31 | 0 | 2 | 89 | 13 | 9 | o | 6.5 | 15.7 | 0.11 | 0.12 |
| 32 | 0 | 4 | 80 | 0 | 16 | 0 | 6.5 | 15.1 | 0.11 | 0.11 |
| 33 | 0 | 6 | 56 | 0 | 38 | 0 | 6.3 | 15.2 | 0.12 | 0.13 |
| 79 | 0 | 1 | 63 | 0 | 36 | 0 | 7.6 | 16.0 | 0.10 | 0.12 |
| 34 | 0 | 2 | 93 | 16 | 5 | 0 | 6.6 | 15.2 | 0.12 | 0.30 |
| 35 | 0 | 2 | 95 | 17 | 3 | 0 | 6.4 | 15.9 | 0.11 | 0.28 |
| 85 | 1 | 2 | 97 | 25 | 0 | 0 | 6.1 | 14.0 | 0.09 | 0.28 |
| 36 | 0 | 2 | 98 | 18 | 0 | 0 | 6.6 | 15.3 | 0.12 | 0.23 |
| 37 | 0 | 2 | 98 | 19 | 0 | 0 | 6.5 | 15.5 | 0.12 | 0.14 |
| 38 | 0 | 2 | 98 | 18 | 0 | 0 | 6.5 | 15.5 | 0.12 | 0.12 |
| 39 | 0 | 3 | 97 | 18 | 0 | 0 | 6.3 | 16.0 | 0.17 | 0.13 |
| 40 | 0 | 4 | 96 | 17 | 0 | 0 | 6.4 | 16.0 | 0.21 | 0.12 |
| 41 | 0 | 5 | 95 | 17 | 0 | 0 | 6.5 | 15.2 | 0.22 | 0.11 |
| 88 | 1 | 1 | 95 | 21 | 3 | 0 | 7.5 | 16.0 | 0.22 | 0.12 |
| 91 | 1 | 1 | 98 | 0 | 0 | 0 | 7.6 | 15.0 | 0.12 | 0.12 |
| 42 | 0 | 2 | 98 | 0 | 0 | 0 | 6.2 | 15.0 | 0.12 | 0.09 |
| 43 | 0 | 2 | 98 | 4 | 0 | 0 | 6.4 | 15.1 | 0.11 | 0.10 |

TABLE 3-4

| Treatment No. | Crystal orientation difference ° | P concentration at prior austenite grain boundaries at % | Plating | Yield stress MPa | Tensile strength MPa | Yield ratio % | Elongation % | dσ/dε (VP + 100 MPa) MPa | dσ/dε (0.9TS) MPa | Brittle-ductile transition temperature ° C. | Note |
|---|---|---|---|---|---|---|---|---|---|---|---|
| 25 | 3.3 | 2.5 | Absent | 1140 | 1561 | 0.73 | 5.0 | 71120 | 23430 | 25 | Comparative Steel |
| 73 | 4.2 | 2.8 | Absent | 1170 | 1603 | 0.73 | 4.1 | 75030 | 23430 | 35 | Comparative Steel |
| 26 | 15.0 | 2.5 | Absent | 1079 | 1498 | 0.72 | 5.1 | 110300 | 35250 | −25 | Comparative Steel |
| 27 | 13.0 | 2.7 | Absent | 1060 | 1493 | 0.71 | 5.2 | 121840 | 34240 | −30 | Comparative Steel |
| 82 | 15.0 | 2.5 | Absent | 751 | 1058 | 0.71 | 7.0 | 123420 | 34250 | −25 | Comparative Steel |
| 28 | 9.0 | 2.6 | Absent | 1004 | 1499 | 0.67 | 4.9 | 152030 | 33230 | −45 | Invention Steel |
| 29 | 6.0 | 2.5 | Absent | 819 | 1489 | 0.55 | 5.0 | 152030 | 29800 | −55 | Invention Steel |
| 30 | 3.8 | 2.5 | Absent | 713 | 1399 | 0.51 | 5.3 | 128700 | 28760 | −48 | Invention Steel |
| 31 | 3.5 | 2.6 | Absent | 863 | 1250 | 0.69 | 5.9 | 100870 | 27490 | −25 | Invention Steel |
| 32 | 3.3 | 2.7 | Absent | 875 | 1167 | 0.75 | 8.2 | 76750 | 27410 | −30 | Comparative Steel |
| 33 | 3.0 | 2.7 | Absent | 745 | 955 | 0.78 | 11.1 | 70100 | 26520 | −25 | Comparative Steel |
| 79 | 3.7 | 2.6 | Absent | 702 | 975 | 0.72 | 7.3 | 76760 | 28550 | −20 | Comparative Steel |
| 34 | 2.8 | 2.7 | Absent | 588 | 1399 | 0.42 | 5.3 | 62380 | 22040 | −30 | Comparative Steel |
| 35 | 3.2 | 2.6 | Absent | 635 | 1411 | 0.45 | 5.3 | 71820 | 23230 | −35 | Comparative Steel |
| 85 | 4.5 | 2.8 | Absent | 840 | 1528 | 0.55 | 4.7 | 72870 | 21970 | −38 | Comparative Steel |
| 36 | 3.4 | 2.7 | Absent | 667 | 1420 | 0.47 | 5.3 | 104760 | 24050 | −45 | Invention Steel |

TABLE 3-4-continued

| Treatment No. | Crystal orientation difference ° | P concentration at prior austenite grain boundaries at % | Plating | Yield stress MPa | Tensile strength MPa | Yield ratio % | Elongation % | dσ/dε (VP + 100 MPa) MPa | dσ/dε (0.9TS) MPa | Brittle-ductile transition temperature ° C. | Note |
|---|---|---|---|---|---|---|---|---|---|---|---|
| 37 | 3.2 | 2.6 | Absent | 743 | 1429 | 0.52 | 5.3 | 129570 | 25040 | −50 | Invention Steel |
| 38 | 3.3 | 2.5 | Absent | 769 | 1450 | 0.53 | 5.3 | 142470 | 28760 | −50 | Invention Steel |
| 39 | 3.2 | 2.6 | Absent | 774 | 1489 | 0.52 | 5.3 | 153080 | 45780 | −45 | Invention Steel |
| 40 | 3.0 | 2.7 | Absent | 745 | 1520 | 0.49 | 5.3 | 159860 | 72030 | −35 | Comparative Steel |
| 41 | 3.0 | 2.7 | Absent | 746 | 1555 | 0.48 | 5.3 | 167650 | 79300 | −30 | Comparative Steel |
| 88 | 3.1 | 3.0 | Absent | 713 | 1425 | 0.50 | 5.6 | 133240 | 78340 | −20 | Comparative Steel |
| 91 | 3.5 | 3.0 | Absent | 908 | 1227 | 0.74 | 5.7 | 70870 | 23440 | 20 | Comparative Steel |
| 42 | 3.2 | 2.6 | Absent | 1102 | 1489 | 0.74 | 5.5 | 70890 | 23570 | 25 | Comparative Steel |
| 43 | 3.3 | 2.7 | Absent | 1057 | 1489 | 0.71 | 5.0 | 75820 | 25890 | 5 | Comparative Steel |

TABLE 3-5

| Treatment No. | Ferrite fraction % | Retained austenite fraction % | Martensite fraction % | Plate martensite fraction % | Upper bainite fraction % | Pearlite fraction % | Average grain size of prior austenite μm | Maximum diameter of prior austenite μm | Solid solution C mass % | Average carbide size in martensite μm |
|---|---|---|---|---|---|---|---|---|---|---|
| 44 | | | | | No data due to fracture | | | | | |
| 45 | 0 | 3 | 97 | 17 | 0 | 0 | 6.4 | 18.0 | 0.06 | 0.13 |
| 46 | 0 | 3 | 97 | 22 | 0 | 0 | 5.2 | 14.0 | 0.07 | 0.14 |
| 47 | 0 | 3 | 97 | 24 | 0 | 0 | 6.8 | 16.0 | 0.08 | 0.15 |
| 50 | 0 | 2 | 98 | 16 | 0 | 0 | 7.5 | 13.0 | 0.07 | 0.28 |
| 51 | 0 | 2 | 98 | 14 | 0 | 0 | 7.1 | 16.0 | 0.07 | 0.27 |
| 52 | 0 | 2 | 98 | 26 | 0 | 0 | 6.6 | 18.0 | 0.22 | 0.08 |
| 53 | 0 | 2 | 98 | 20 | 0 | 0 | 7.5 | 18.0 | 0.25 | 0.07 |
| 54 | 0 | 2 | 98 | 17 | 0 | 0 | 5.9 | 15.0 | 0.08 | 0.14 |
| 55 | 1 | 2 | 97 | 23 | 0 | 0 | 6.9 | 14.0 | 0.08 | 0.14 |
| 56 | 1 | 1 | 98 | 20 | 0 | 0 | 7.8 | 15.0 | 0.07 | 0.13 |
| 57 | 1 | 1 | 98 | 22 | 0 | 0 | 6.3 | 14.0 | 0.06 | 0.18 |
| 58 | 0 | 2 | 98 | 21 | 0 | 0 | 6.1 | 14.0 | 0.08 | 0.35 |
| 59 | 0 | 2 | 98 | 4 | 0 | 0 | 9.5 | 25.0 | 0.14 | 0.09 |
| 60 | 0 | 2 | 98 | 4 | 0 | 0 | 18.0 | 22.0 | 0.12 | 0.08 |
| 61 | 0 | 2 | 98 | 4 | 0 | 0 | 15.0 | 17.0 | 0.10 | 0.14 |
| 62 | 0 | 2 | 98 | 3 | 0 | 0 | 13.0 | 18.3 | 0.09 | 0.11 |
| 63 | 0 | 2 | 98 | 5 | 0 | 0 | 17.0 | 22.1 | 0.08 | 0.09 |
| 64 | 0 | 2 | 98 | 3 | 0 | 0 | 8.9 | 25.0 | 0.12 | 0.15 |
| 65 | 0 | 2 | 98 | 3 | 0 | 0 | 8.4 | 21.0 | 0.10 | 0.11 |
| 66 | 0 | 2 | 98 | 19 | 0 | 0 | 5.2 | 15.0 | 0.10 | 0.09 |
| 67 | 0 | 2 | 98 | 22 | 0 | 0 | 7.6 | 18.0 | 0.09 | 0.15 |
| 68 | 1 | 2 | 93 | 3 | 4 | 0 | 12.0 | 22.8 | 0.12 | 0.10 |
| 69 | 1 | 2 | 93 | 3 | 4 | 0 | 11.0 | 21.4 | 0.11 | 0.09 |
| 94 | 0 | 1 | 95 | 5 | 4 | 0 | 11.0 | 22.8 | 0.13 | 0.09 |

TABLE 3-6

| Treatment No. | Crystal orientation difference ° | P concentration at prior austenite grain boundaries at % | Plating | Yield stress MPa | Tensile strength MPa | Yield ratio % | Elongation % | dσ/dε (YP + 100 MPa) MPa | dσ/dε (0.9TS) MPa | Brittle-ductile transition temperature ° C. | Note |
|---|---|---|---|---|---|---|---|---|---|---|---|
| 44 | | | | No data due to fracture | | | | | | | Comparative Steel |
| 45 | 3.6 | 2.8 | Absent | 853 | 1470 | 0.58 | 5.4 | 169880 | 20104 | −50 | Invention Steel |
| 46 | 3.1 | 2.9 | Absent | 860 | 1458 | 0.59 | 4.9 | 154300 | 18046 | −50 | Invention Steel |
| 47 | 3.1 | 3.0 | Absent | 869 | 1448 | 0.60 | 5.4 | 132220 | 16331 | −45 | Invention Steel |
| 50 | 3.1 | 2.5 | Absent | 994 | 1400 | 0.71 | 5.4 | 73741 | 15884 | −35 | Comparative Steel |
| 51 | 3.2 | 3.0 | Absent | 1002 | 1411 | 0.71 | 5.4 | 71611 | 15401 | 5 | Comparative Steel |
| 52 | 4.2 | 2.6 | Absent | 758 | 1580 | 0.48 | 4.4 | 140790 | 87840 | −20 | Comparative Steel |
| 53 | 3.4 | 2.9 | Absent | 752 | 1600 | 0.47 | 5.0 | 144430 | 98970 | −30 | Comparative Steel |
| 54 | 4.4 | 2.5 | GI | 787 | 1430 | 0.55 | 5.6 | 137560 | 30120 | −45 | Invention Steel |
| 55 | 4.2 | 2.7 | GI | 794 | 1587 | 0.50 | 5.0 | 182890 | 31230 | −45 | Invention Steel |
| 56 | 3.4 | 2.9 | GA | 890 | 1680 | 0.53 | 4.8 | 201030 | 25450 | −45 | Invention Steel |
| 57 | 3.0 | 2.5 | Absent | 859 | 1789 | 0.48 | 4.1 | 213050 | 21440 | −45 | Invention Steel |
| 58 | 4.2 | 3.0 | Absent | 812 | 1504 | 0.54 | 5.2 | 150710 | 26490 | 10 | Comparative Steel |
| 59 | 4.5 | 2.7 | Absent | 752 | 1504 | 0.50 | 4.5 | 55220 | 26620 | 35 | Comparative Steel |
| 60 | 4.1 | 2.9 | Absent | 1089 | 1534 | 0.71 | 5.4 | 51372 | 31380 | 30 | Comparative Steel |
| 61 | 3.1 | 2.5 | Absent | 1040 | 1444 | 0.72 | 5.0 | 48836 | 24830 | 20 | Comparative Steel |
| 62 | 4.5 | 2.5 | Absent | 1102 | 1489 | 0.74 | 4.9 | 53256 | 24860 | 35 | Comparative Steel |
| 63 | 3.4 | 2.5 | Absent | 1120 | 1534 | 0.73 | 5.0 | 57696 | 21280 | 55 | Comparative Steel |
| 64 | 4.1 | 2.6 | Absent | 1050 | 1459 | 0.72 | 5.3 | 67544 | 29530 | 32 | Comparative Steel |
| 65 | 4.1 | 2.9 | Absent | 1057 | 1489 | 0.71 | 4.7 | 49672 | 33440 | 20 | Comparative Steel |
| 66 | 4.2 | 5.2 | Absent | 782 | 1504 | 0.52 | 4.5 | 167990 | 21680 | 20 | Comparative Steel |
| 67 | 3.5 | 4.5 | Absent | 828 | 1534 | 0.54 | 5.3 | 133870 | 25570 | 10 | Comparative Steel |
| 68 | 4.4 | 5.8 | Absent | 736 | 1534 | 0.73 | 4.5 | 53260 | 21540 | 50 | Comparative Steel |
| 69 | 4.4 | 4.2 | Absent | 819 | 1489 | 0.75 | 4.9 | 55120 | 22730 | 34 | Comparative Steel |
| 94 | 4.5 | 4.2 | Absent | 564 | 1152 | 0.78 | 6.7 | 58820 | 32390 | 50 | Comparative Steel |

TABLE 3-7

| Treatment No. | Ferrite fraction % | Retained austenite fraction % | Martensite fraction % | Plate martensite fraction % | Upper bainite fraction % | Pearlite fraction % | Average grain size of prior austenite μm | Maximum diameter of prior austenite μm | Solid solution C mass % | Average carbide size in martensite μm |
|---|---|---|---|---|---|---|---|---|---|---|
| 70 | 0 | 2 | 98 | 12 | 0 | 0 | 9.4 | 18.0 | 0.13 | 0.14 |
| 71 | 1 | 2 | 94 | 26 | 3 | 0 | 7.5 | 17.0 | 0.13 | 0.15 |
| 72 | 1 | 2 | 97 | 16 | 0 | 0 | 7.6 | 13.0 | 0.13 | 0.10 |
| 74 | 1 | 1 | 98 | 15 | 0 | 0 | 7.6 | 16.0 | 0.10 | 0.13 |
| 75 | 1 | 1 | 95 | 25 | 3 | 0 | 5.5 | 14.0 | 0.08 | 0.12 |
| 77 | 1 | 1 | 98 | 19 | 0 | 0 | 5.9 | 14.0 | 0.12 | 0.08 |
| 78 | 1 | 1 | 98 | 26 | 0 | 0 | 6.2 | 17.0 | 0.09 | 0.12 |
| 80 | 1 | 2 | 96 | 26 | 1 | 0 | 5.6 | 16.0 | 0.10 | 0.15 |
| 81 | 0 | 2 | 98 | 19 | 0 | 0 | 7.3 | 17.0 | 0.14 | 0.11 |
| 83 | 0 | 2 | 98 | 15 | 0 | 0 | 7.4 | 18.0 | 0.14 | 0.09 |
| 84 | 0 | 2 | 98 | 19 | 0 | 0 | 6.5 | 17.0 | 0.10 | 0.15 |
| 86 | 1 | 1 | 98 | 23 | 0 | 0 | 6.8 | 16.0 | 0.08 | 0.15 |
| 87 | 1 | 1 | 98 | 20 | 0 | 0 | 7.6 | 18.0 | 0.08 | 0.09 |
| 89 | 1 | 1 | 95 | 26 | 3 | 0 | 6.3 | 17.0 | 0.11 | 0.09 |

TABLE 3-7-continued

| Treatment No. | Ferrite fraction % | Retained austenite fraction % | Martensite fraction % | Plate martensite fraction % | Upper bainite fraction % | Pearlite fraction % | Average grain size of prior austenite μm | Maximum diameter of prior austenite μm | Solid solution C mass % | Average carbide size in martensite μm |
|---|---|---|---|---|---|---|---|---|---|---|
| 90 | 1 | 1 | 98 | 28 | 0 | 0 | 6.3 | 13.0 | 0.09 | 0.13 |
| 92 | 0 | 2 | 98 | 26 | 0 | 0 | 7.4 | 14.0 | 0.10 | 0.11 |
| 93 | 1 | 1 | 98 | 23 | 0 | 0 | 5.7 | 13.0 | 0.11 | 0.13 |
| 95 | 0 | 2 | 97 | 16 | 1 | 0 | 7.9 | 18.0 | 0.09 | 0.13 |
| 96 | 0 | 1 | 97 | 28 | 2 | 0 | 7.3 | 16.0 | 0.10 | 0.13 |
| 97 | 0 | 2 | 97 | 16 | 1 | 0 | 7.4 | 17.0 | 0.08 | 0.12 |
| 98 | 0 | 2 | 97 | 19 | 1 | 0 | 7.4 | 13.0 | 0.12 | 0.08 |
| 99 | 0 | 2 | 96 | 24 | 2 | 0 | 6.4 | 14.0 | 0.09 | 0.14 |
| 100 | 0 | 0 | 99 | 16 | 1 | 0 | 5.1 | 16.0 | 0.08 | 0.15 |
| 101 | 0 | 1 | 98 | 24 | 1 | 0 | 6.3 | 16.0 | 0.08 | 0.08 |
| 102 | 2 | I | 96 | 28 | I | 0 | 8.0 | 16.0 | 0.09 | 0.09 |

TABLE 3-8

| Treatment No. | Crystal orientation difference ° | P concentration at prior austenite grain boundaries at % | Plating | Yield stress MPa | Tensile strength MPa | Yield ratio % | Elongation % | dσ/dε (YP + 100 MPa) MPa | dσ/dε (0.9TS) MPa | Brittle-ductile transition temperature ° C. | Note |
|---|---|---|---|---|---|---|---|---|---|---|---|
| 70 | 4.1 | 3.8 | Absent | 794 | 1444 | 0.55 | 4.8 | 105670 | 31710 | −15 | Invention Steel |
| 71 | 3.2 | 2.7 | Absent | 779 | 1558 | 0.50 | 4.6 | 161050 | 30530 | −57 | Invention Steel |
| 72 | 3.2 | 2.5 | Absent | 877 | 1655 | 0.53 | 4.8 | 140240 | 33580 | −45 | Invention Steel |
| 74 | 4.1 | 3.0 | Absent | 932 | 1759 | 0.53 | 3.7 | 139610 | 33510 | −86 | Invention Steel |
| 75 | 4.3 | 3.0 | Absent | 941 | 1742 | 0.54 | 3.8 | 136730 | 27460 | −80 | Invention Steel |
| 77 | 4.5 | 2.6 | Absent | 967 | 1897 | 0.51 | 3.8 | 127700 | 25720 | −89 | Invention Steel |
| 78 | 3.8 | 2.7 | Absent | 957 | 1805 | 0.53 | 3.6 | 138640 | 20560 | −85 | Invention Steel |
| 80 | 3.4 | 2.8 | Absent | 523 | 1068 | 0.49 | 6.9 | 124170 | 34970 | −50 | Invention Steel |
| 81 | 3.2 | 2.9 | Absent | 550 | 1037 | 0.53 | 7.2 | 155700 | 32240 | −50 | Invention Steel |
| 83 | 3.5 | 3.0 | Absent | 817 | 1513 | 0.54 | 5.1 | 150580 | 20540 | −69 | Invention Steel |
| 84 | 3.7 | 2.8 | Absent | 726 | 1482 | 0.49 | 5.0 | 121900 | 22620 | −46 | Invention Steel |
| 86 | 3.6 | 2.9 | Absent | 712 | 1453 | 0.49 | 5.1 | 124630 | 20980 | −45 | Invention Steel |
| 87 | 3.8 | 3.0 | Absent | 684 | 1368 | 0.50 | 5.1 | 124830 | 25180 | −45 | Invention Steel |
| 89 | 3.5 | 2.9 | Absent | 626 | 1203 | 0.52 | 6.6 | 153910 | 32570 | −60 | Invention Steel |
| 90 | 3.7 | 2.9 | Absent | 614 | 1203 | 0.51 | 6.1 | 150870 | 28500 | −60 | Invention Steel |
| 92 | 3.2 | 2.5 | Absent | 564 | 1176 | 0.48 | 6.5 | 131510 | 34510 | −45 | Invention Steel |
| 93 | 3.5 | 3.0 | Absent | 570 | 1164 | 0.49 | 6.0 | 145670 | 29530 | −45 | Invention Steel |
| 95 | 3.2 | 2.8 | Absent | 844 | 1655 | 0.51 | 4.4 | 120870 | 32360 | −50 | Invention Steel |
| 96 | 3.0 | 2.9 | Absent | 967 | 1759 | 0.55 | 4.3 | 123660 | 33860 | −45 | Invention Steel |
| 97 | 4.5 | 2.8 | Absent | 869 | 1639 | 0.53 | 4.7 | 125750 | 34210 | −45 | Invention Steel |
| 98 | 3.9 | 2.9 | Absent | 633 | 1292 | 0.49 | 5.9 | 153340 | 24760 | −50 | Invention Steel |
| 99 | 4.1 | 2.5 | Absent | 768 | 1568 | 0.49 | 4.5 | 136540 | 27710 | −46 | Invention Steel |

TABLE 3-8-continued

| Treatment No. | Crystal orientation difference ° | P concentration at prior austenite grain boundaries at % | Plating | Yield stress MPa | Tensile strength MPa | Yield ratio % | Elongation % | dσ/dε (YP + 100 MPa) MPa | dσ/dε (0.9TS) MPa | Brittle-ductile transition temperature ° C. | Note |
|---|---|---|---|---|---|---|---|---|---|---|---|
| 100 | 4.5 | 2.7 | Absent | 733 | 1332 | 0.55 | 6.0 | 158020 | 26010 | −45 | Invention Steel |
| 101 | 3.1 | 2.6 | Absent | 739 | 1421 | 0.52 | 4.8 | 163080 | 30900 | −50 | Invention Steel |
| 102 | 3.5 | 2.5 | Absent | 960 | 1746 | 0.55 | 3.8 | 163320 | 32200 | −54 | Invention Steel |

TABLE 3-9

| Treatment No. | Ferrite fraction % | Retained austenite fraction % | Martensite fraction % | Plate martensite fraction % | Upper bainite fraction % | Pearlite fraction % | Average grain size of prior austenite μm | Maximum diameter of prior austenite μm | Solid solution C mass % | Average carbide size in martensite μm |
|---|---|---|---|---|---|---|---|---|---|---|
| 103 | 1 | 1 | 98 | 22 | 0 | 0 | 6.5 | 14.0 | 0.10 | 0.14 |
| 104 | 1 | 0 | 99 | 26 | 0 | 0 | 5.6 | 18.0 | 0.13 | 0.08 |
| 105 | 1 | 0 | 99 | 25 | 0 | 0 | 5.9 | 13.0 | 0.11 | 0.11 |
| 106 | 1 | 1 | 98 | 18 | 0 | 0 | 5.6 | 14.0 | 0.11 | 0.11 |
| 107 | 2 | 1 | 96 | 24 | 1 | 0 | 7.7 | 14.0 | 0.13 | 0.09 |
| 108 | 1 | 2 | 97 | 18 | 0 | 0 | 6.1 | 14.0 | 0.10 | 0.13 |
| 109 | 1 | 2 | 97 | 18 | 0 | 0 | 7.1 | 13.0 | 0.12 | 0.14 |
| 119 | 8 | 7 | 74 | 26 | 8 | 3 | 5.8 | 14.0 | 0.15 | 0.17 |
| 110 | 2 | 1 | 93 | 25 | 4 | 0 | 7.4 | 14.0 | 0.25 | 0.34 |
| 111 | 1 | 1 | 98 | 21 | 0 | 0 | 7.8 | 16.0 | 0.10 | 0.15 |
| 112 | 1 | 2 | 97 | 17 | 0 | 0 | 6.1 | 15.0 | 0.08 | 0.10 |
| 113 | Fractured during cold rolling | | | | | | | | | |
| 114 | 41 | 2 | 53 | 0 | 4 | 0 | 7.8 | 16.0 | 0.11 | 0.09 |
| 115 | 1 | 1 | 98 | 14 | 0 | 0 | 5.3 | 17.0 | 0.11 | 0.08 |
| 116 | 2 | 1 | 94 | 25 | 3 | 0 | 5.6 | 14.0 | 0.14 | 0.13 |
| 117 | 1 | 1 | 98 | 21 | 0 | 0 | 8.0 | 17.0 | 0.09 | 0.09 |
| 118 | 2 | 0 | 97 | 21 | 1 | 0 | 7.0 | 13.0 | 0.14 | 0.13 |

TABLE 3-10

| Treatment No. | Crystal orientation difference ° | P concentration at prior austenite grain boundaries at % | Plating | Yield stress MPa | Tensile strength MPa | Yield ratio % | Elongation % | dσ/dε (YP + 100 MPa) MPa | dσ/dε (0.9TS) MPa | Brittle-ductile transition temperature ° C. | Note |
|---|---|---|---|---|---|---|---|---|---|---|---|
| 103 | 3.2 | 2.9 | Absent | 856 | 1746 | 0.49 | 3.9 | 120770 | 25530 | −136 | Invention Steel |
| 104 | 4.5 | 3.0 | Absent | 807 | 1552 | 0.52 | 4.7 | 138450 | 26810 | −55 | Invention Steel |
| 105 | 3.7 | 3.0 | Absent | 784 | 1568 | 0.50 | 4.8 | 165400 | 21760 | −59 | Invention Steel |
| 106 | 3.4 | 2.5 | Absent | 681 | 1239 | 0.55 | 5.6 | 143540 | 33760 | −45 | Invention Steel |
| 107 | 3.4 | 3.0 | Absent | 688 | 1251 | 0.55 | 6.1 | 122750 | 22060 | −50 | Invention Steel |
| 108 | 3.9 | 2.5 | Absent | 843 | 1591 | 0.53 | 5.2 | 147060 | 32290 | −50 | Invention Steel |
| 109 | 3.0 | 2.8 | Absent | 794 | 1655 | 0.48 | 4.4 | 134780 | 33800 | −75 | Invention Steel |
| 119 | 3.4 | 2.8 | Absent | 485 | 989 | 0.49 | 9.2 | 140560 | 45893 | −30 | Invention Steel |
| 110 | 4.3 | 2.6 | Absent | 1061 | 2040 | 0.52 | 2.0 | 165840 | 80080 | 100 | Comparative Steel |
| 111 | 3.5 | 2.7 | Absent | 471 | 888 | 0.53 | 8.9 | 129510 | 30510 | −100 | Comparative Steel |

TABLE 3-10-continued

| Treatment No. | Crystal orientation difference ° | P concentration at prior austenite grain boundaries at % | Plating | Yield stress MPa | Tensile strength MPa | Yield ratio % | Elongation % | dσ/dε (YP + 100 MPa) MPa | dσ/dε (0.9TS) MPa | Brittle-ductile transition temperature ° C. | Note |
|---|---|---|---|---|---|---|---|---|---|---|---|
| 112 | 3.6 | 2.9 | Absent | 713 | 1346 | 0.53 | 5.0 | 162160 | 32300 | 30 | Comparative Steel |
| 113 | | | | Fractured during cold rolling | | | | | | | Comparative Steel |
| 114 | 3.0 | 2.7 | Absent | 447 | 828 | 0.54 | 9.2 | 78720 | 23210 | −100 | Comparative Steel |
| 115 | 3.3 | 3.8 | Absent | 823 | 1552 | 0.53 | 4.7 | 168120 | 20830 | 35 | Comparative Steel |
| 116 | 4.1 | 2.7 | Absent | 604 | 1119 | 0.54 | 6.6 | 129010 | 33920 | 15 | Comparative Steel |
| 117 | 3.2 | 2.8 | Absent | 855 | 1781 | 0.48 | 4.0 | 168570 | 21070 | 15 | Comparative Steel |
| 118 | 4.4 | 2.8 | Absent | 571 | 1190 | 0.48 | 6.2 | 137630 | 30580 | 15 | Comparative Steel |

A case of tensile strength TS≥980 MP, yield ratio YP/TS≤0.7, dσ/dε at YP+100 MPa (dσ/dε (YP+100 MPa)) ≥100,000, dσ/dε at TS×0.9 (dσ/dε (0.9TS))≤50,000, and brittle-ductile transition temperature ≤0° C. was determined to be excellent in shape fixability and impact resistance after pressing.

The chemical composition of each of the obtained steel sheets was substantially the same as the chemical composition of the corresponding cast slab.

In Treatments Nos. 2 and 3, in the annealing step, the heating rate in the temperature range of 650° C. to 750° C. was slow, the average grain size of prior austenite was large, and the plate martensite fraction was low. As a result, the yield ratio was high, dσ/dε (YP+100 MPa) was low, and the brittle-ductile transition temperature was high.

In Treatments Nos. 4 and 5, the heating rate in the temperature range of 650° C. to 750° C. was too fast, and the maximum diameter of prior austenite was large. As a result, the brittle-ductile transition temperature was high.

In Treatments Nos. 6 and 7, the highest heating temperature in the annealing step was too low, and the ferrite fraction was high. As a result, dσ/dε (YP+100 MPa) became low and the brittle-ductile transition temperature became high.

In Treatments Nos. 8 and 9, the highest heating temperature in the annealing step was too high, the average grain size of prior austenite and the maximum diameter of prior austenite were large, and plate martensite fraction was also low. As a result, the yield ratio was high, dσ/dε (YP+100 MPa) was low, and the brittle-ductile transition temperature was high.

In Treatments Nos. 10 and 11, the retention time in the temperature range of Ac3 to 1000° C. during heating in the annealing step was short, and the ferrite fraction was high. As a result, dσ/dε (YP+100 MPa) was low and the brittle-ductile transition temperature was high.

In Treatments Nos. 12 and 13, the retention time in the temperature range of Ac3 to 1000° C. during heating in the annealing step was long, the average grain size of prior austenite and the maximum diameter of prior austenite were large, and the plate martensite fraction was also low. As a result, the yield ratio was high, dσ/dε (YP+100 MPa) was low, and the brittle-ductile transition temperature was high.

In Treatment No. 14, the cooling rate in the temperature range of 740° C. or lower and higher than 550° C. was slow, and the ferrite fraction was high. As a result, dσ/dε (YP+100 MPa) was low and the brittle-ductile transition temperature was also high.

In Treatment No. 15, the cooling rate in the temperature range of 740° C. or lower and higher than 550° C., the ferrite fraction was high. As a result, the strength was low, dσ/dε (YP+100 MPa) was low, and the brittle-ductile transition temperature was also high.

In Treatments Nos. 16 and 17, the cooling rate in the temperature range of 550° C. or lower and higher than Ms° C. was slow, the upper bainite fraction was high, and the plate martensite fraction was low. As a result, the yield ratio was high and dσ/dε (YP+100 MPa) was low.

In Treatments Nos. 18, 19, and 76, the cooling rate in the temperature range of Ms° C. or lower and higher than Ms-15° C. was slow, the upper bainite fraction was high, and the plate martensite fraction was low. As a result, the yield ratio was high and dσ/dε (YP+100 MPa) was low.

In Treatments Nos. 24, 25, and 73, the cooling rate in the temperature range of Ms° C. or lower and higher than Ms-15° C. was fast, and the plate martensite fraction was low. As a result, the yield ratio was high, d6/dc (YP+100 MPa) was low, and the brittle-ductile transition temperature MPa) was high.

In Treatments Nos. 26, 27, and 82, the cooling rate in the temperature range of Ms-15° C. or lower and higher than Ms-40° C. was fast, and the crystal orientation difference was large. As a result, the yield ratio was high.

In Treatments Nos. 32, 33, and 79, the cooling rate in the temperature range of Ms-15° C. or lower and higher than Ms-40° C. was slow, the upper bainite fraction was high, and the plate martensite fraction was low. As a result, the yield ratio was high and dσ/dε (YP+100 MPa) was low.

In Treatments Nos. 34, 35, and 85, the cooling rate in the temperature range of Ms-40° C. to Ms-120° C. was slow, and the average carbide size in martensite was large. As a result, dσ/dε (YP+100 MPa) was low.

In Treatments Nos. 40, 41, and 88, the cooling rate in the temperature range of Ms-40° C. to Ms-120° C. was fast, and the amount of solid solution C was large. As a result, dσ/dε (0.9TS) was high.

In Treatments Nos. 42, 43, and 91, the tensile stress in the temperature range of Ms° C. to Ms-120° C. was low, and the plate martensite fraction was low. As a result, the yield ratio was high, dσ/dε (YP+100 MPa) was low, and the brittle-ductile transition temperature was high.

In Treatment No. 44, the tensile stress in the temperature range of Ms° C. to Ms-120° C. was too high, so that fracture had occurred in the tensile test.

In Treatments Nos. 50 and 51, the cooling rate at lower than Ms-120° C. was slow, and the average carbide size in martensite was large. As a result, the yield ratio was high and dσ/dε (YP+100 MPa) was low.

In Treatments Nos. 52 and 53, the cooling rate at Ms-120° C. or lower was fast, and the amount of solid solution C was large. As a result, dσ/dε (0.9TS) was high.

In Treatment No. 58, the heating temperature during hot rolling was low, and the average carbide size in martensite was large. As a result, the brittle-ductile transition temperature was high.

In Treatment No. 59, the heating temperature during hot rolling was high, the maximum diameter of prior austenite was large, and the plate martensite fraction was also low. As a result, dσ/dε (YP+100 MPa) was low and the brittle-ductile transition temperature was high.

In Treatment Nos. 60, the rolling reduction in the temperature range of 1050° C. or higher was low, the average grain size of prior austenite and the maximum diameter of prior austenite were large, and the plate martensite fraction was low. As a result, the yield ratio was high, dσ/dε (YP+100 MPa) was low, and the brittle-ductile transition temperature was high.

In Treatment No. 61, the rolling reduction in the temperature range of 1050° C. or higher was low, the average grain size of prior austenite was large, and the plate martensite fraction was also low. As a result, the yield ratio was high, dσ/dε (YP+100 MPa) was low, and the brittle-ductile transition temperature was high.

In Treatment No. 62, the time from the end of hot rolling to the start of rapid cooling was long, the average grain size of prior austenite was large, and the plate martensite fraction was also low. As a result, the yield ratio was high, dσ/dε (YP+100 MPa) was low, and the brittle-ductile transition temperature was high.

In Treatment No. 63, the time from the end of hot rolling to the start of rapid cooling was long, the average grain size of prior austenite and the maximum diameter of prior austenite were large, and the plate martensite fraction was also low. As a result, the yield ratio was high, dσ/dε (YP+100 MPa) was low, and the brittle-ductile transition temperature was high.

In Treatments Nos. 64 and 65, the cooling rate in the temperature range of 850° C. or lower and higher than 700° C. was slow, the maximum diameter of prior austenite was large, and the plate martensite fraction was also low. As a result, the yield ratio was high, dσ/dε (YP+100 MPa) was low, and the brittle-ductile transition temperature was high.

In Treatments Nos. 66 and 67, the cooling rate from 700° C. to the coiling temperature was slow, and the P concentration at the prior austenite grain boundaries was high. As a result, the brittle-ductile transition temperature was high.

In Treatments Nos. 68, 69, and 94, the coiling temperature was high, the average grain size of prior austenite and the maximum diameter of prior austenite were large, the plate martensite fraction was low, and the P concentration at the prior austenite grain boundaries was high. As a result, the yield ratio was high, dσ/dε (YP+100 MPa) was low, and the brittle-ductile transition temperature was high.

In Treatment No. 110, the C content was high, and the amount of solid solution C in martensite and the average carbide size were large. As a result, dσ/dε (0.9TS) was high and the brittle-ductile transition temperature was high.

In Treatment No. 111, the C content of the steel sheet was low. As a result, the tensile strength was low.

In Treatment No. 112, the Si content of the steel sheet was high. As a result, the brittle-ductile transition temperature was high.

In Treatment No. 113, the Mn content of the steel sheet was high. As a result, fracture had occurred during cold rolling and evaluation could not be performed.

In Treatment No. 114, the Mn content of the steel sheet was low and the ferrite fraction was high. As a result, the tensile strength was low.

In Treatment No. 115, the P content of the steel sheet was high. As a result, the brittle-ductile transition temperature was high.

In Treatment No. 116, the S content of the steel sheet was high. As a result, the brittle-ductile transition temperature was high.

In Treatment No. 117, the Al content of the steel sheet was high. As a result, the brittle-ductile transition temperature was high.

In Treatment No. 118, the B content of the steel sheet was high. As a result, the brittle-ductile transition temperature was high.

Regarding other conditions, the structure within the ranges of the present invention was formed, and the tensile strength, yield ratio, dσ/dε (YP+100 MPa), dσ/dε (0.9TS), and brittle-ductile transition temperature were good and within the ranges of the present invention.

INDUSTRIAL APPLICABILITY

As described above, according to the present invention, a steel sheet having a low yield ratio, a large amount of work hardening after yielding, a small amount of work hardening in a high strain region, and excellent toughness is achieved.

Therefore, the present invention is highly applicable in the steel sheet manufacturing industry, the automobile manufacturing industry, and other machine manufacturing industries.

The invention claimed is:
1. A steel sheet comprising, as a chemical composition, by mass %:
C: 0.15% to 0.40%;
Si: 0.01% to 2.00%;
Mn: 0.10% to 4.00%;
Al: 0.005% to 1.500;
P: 0.001% to 0.100%;
S: 0.0005% to 0.0100%;
N: 0.0005% to 0.0100%;
Ti: 0% to 0.200%;
Mo: 0% to 0.300%;
Nb: 0% to 0.200%;
Cr: 0% to 4.000%;
B: 0% to 0.0050%;
V: 0% to 0.300%;
Ni: 0% to 4.00%;
Cu: 0% to 4.00%;
W: 0% to 2.00%;
Ca: 0% to 0.0100%;
Ce: 0% to 0.0100%;
Mg: 0% to 0.0100%;
Zr: 0% to 0.0100%;
La: 0% to 0.0100%;
REM other than Ce and La: 0% to 0.0100%;
Sn: 0% to 1.000%;
Sb: 0% to 0.200%; and a remainder: Fe and impurities,
wherein a microstructure at a ¼ thickness which is a range between a ⅛ thickness position in a sheet thickness direction from a surface of the steel sheet and a ⅜ thickness position in the sheet thickness direction from the surface includes, by area ratio,
ferrite: 0% to 10%,
retained austenite: 0% to 10%,
upper bainite: 0% to 10%,
martensite: 70% to 100%, and
pearlite: 0% to 5%,
an area ratio of plate martensite contained in the martensite is 10% to 35% with respect to an area of an entire structure of the steel sheet,
an average grain size of prior austenite grains is 2.0 μm to 10.0 μm, and a maximum diameter of the prior austenite grains is 20.0 μm or less,
an amount of solid solution C in the martensite is 0.20 mass % or less,
an average carbide size in the martensite is 0.25 μm or less,
a crystal orientation difference between the plate martensite and another martensite adjacent to the plate martensite in the same prior austenite grain is 10.0° or less, and
a P concentration at grain boundaries of the prior austenite grains is 4.0 at % or less.

2. The steel sheet according to claim 1,
wherein a hot-dip galvanized layer is formed on the surface.

3. The steel sheet according to claim 2,
wherein the hot-dip galvanized layer is a hot-dip galvannealed layer.

4. A method for manufacturing the steel sheet of claim 1, comprising:
a casing step of melting a steel having the chemical composition according to claim 1 and casting the melted steel to obtain a steel piece;
a hot rolling step of heating the steel piece to 1150° C. to 1350° C. and performing hot rolling in a temperature range of 1050° C. or higher at a cumulative rolling reduction of 35% or more to obtain a hot-rolled steel sheet;
a cooling step of performing cooling, which is started within three seconds after completion of the hot rolling step, to a coiling temperature so that an average cooling rate in a temperature range of 850° C. or lower and higher than 700° C. is 20° C./sec to 100° C./sec and an average cooling rate from 700° C. to the coiling temperature is 30° C./sec to 80° C./sec;
a coiling step of coiling the hot-rolled steel sheet after the cooling step at a coiling temperature of 650° C. or lower;
a cold rolling step of performing cold rolling on the hot-rolled steel sheet after the coiling step to obtain a cold-rolled steel sheet;
an annealing step of heating the cold-rolled steel sheet to an annealing temperature of Ac3 to 1000° C. so that an average heating rate in a temperature range of 650° C. to 750° C. is 0.5 to 5.0° C./sec, and performing holding at the annealing temperature for 3 to 100 seconds;
a post-annealing cooling step of cooling the cold-rolled steel sheet after the annealing step so that an average cooling rate in a temperature range of 740° C. or lower and higher than 550° C. is 10° C./sec or faster, an average cooling rate in a temperature range of 550° C. or lower and higher than Ms° C. is 30° C./sec or faster, an average cooling rate in a temperature range of Ms° C. or lower and higher than Ms-15° C. is 5° C/sec to 40° C./sec, an average cooling rate in a temperature range of Ms-15° C. or lower and higher than Ms-40° C. is 25° C./sec to 120° C./sec, and an average cooling rate in a temperature range of Ms-40° C. to Ms-120° C. is 5° C./sec to 40° C./sec; and
a final cooling step of cooling the cold-rolled steel sheet after the post-annealing cooling step to room temperature at an average cooling rate of 0.5° C./sec to 10° C./sec,
wherein, in the post-annealing cooling step, a tensile stress of 20 to 100 MPa is applied to the cold-rolled steel sheet in a temperature range of Ms° C. to Ms-120° C.,
where Ms is calculated by the following expression:

$$Ms(° C.)=550-361 \times C-39 \times Mn-35 \times V-20 \times Cr-17 \times Ni-10 \times Cu-5 \times Mo-5 \times W+30 \times Al,$$ and C, Mn, V, Cr, Ni, Cu, Mo, W, and Al in the above expression are amounts (mass%) of corresponding elements of the steel piece.

5. The method for manufacturing a steel sheet according to claim 4, wherein, in the post-annealing cooling step, an average cooling rate is changed for each of the temperature ranges.

6. The method for manufacturing a steel sheet according to claim 4, wherein the final cooling step includes a step of holding the cold-rolled steel sheet after the post-annealing cooling step in a temperature range of Ms-120° C. to 450° C. for 1000 seconds or shorter, and performing cooling to room temperature at an average cooling rate of 0.5° C./sec or faster and 10° C./sec or slower.

7. The method for manufacturing a steel sheet according to claim 5,
wherein the final cooling step includes a step of holding the cold-rolled steel sheet after the post-annealing cooling step in a temperature range of Ms-120° C. to 450° C. for 1000 seconds or shorter, and performing cooling to room temperature at an average cooling rate of 0.5 ° C./sec or faster and 10° C./sec or slower.

8. The method for manufacturing a steel sheet according to claim 4, further comprising:
a hot-dip galvanizing step of immersing the cold-rolled steel sheet in a molten zinc bath, between the post-annealing cooling step and the final cooling step.

9. The method for manufacturing a steel sheet according to claim 5, further comprising:
a hot-dip galvanizing step of immersing the cold-rolled steel sheet in a molten zinc bath, between the post-annealing cooling step and the final cooling step.

10. The method for manufacturing a steel sheet according to claim 6, further comprising:
a hot-dip galvanizing step of immersing the cold-rolled steel sheet in a molten zinc bath, between the post-annealing cooling step and the final cooling step.

11. The method for manufacturing a steel sheet according to claim 7, further comprising:
a hot-dip galvanizing step of immersing the cold-rolled steel sheet in a molten zinc bath, between the post-annealing cooling step and the final cooling step.

12. The method for manufacturing a steel sheet according to claim 8, further comprising:
an alloying step of reheating the cold-rolled steel sheet to 470° C. to 550° C. and performing holding for 60 seconds or shorter, between the hot-dip galvanizing step and the final cooling step.

13. The method for manufacturing a steel sheet according to claim 9, further comprising:
an alloying step of reheating the cold-rolled steel sheet to 470° C. to 550° C. and performing holding for 60 seconds or shorter, between the hot-dip galvanizing step and the final cooling step.

14. The method for manufacturing a steel sheet according to claim 10, further comprising:
an alloying step of reheating the cold-rolled steel sheet to 470° C. to 550° C. and performing holding for 60 seconds or shorter, between the hot-dip galvanizing step and the final cooling step.

15. The method for manufacturing a steel sheet according to claim 11, further comprising:
an alloying step of reheating the cold-rolled steel sheet to 470° C. to 550° C. and performing holding for 60 seconds or shorter, between the hot-dip galvanizing step and the final cooling step.

* * * * *